US010083281B2

(12) United States Patent
Miki

(10) Patent No.: US 10,083,281 B2
(45) Date of Patent: Sep. 25, 2018

(54) TERMINAL DEVICE AND INFORMATION PROCESSING SYSTEM FOR IMPLEMENTING SCREEN SHARING PROCESS BASED ON USER ROLE

(71) Applicant: Morio Miki, Kanagawa (JP)

(72) Inventor: Morio Miki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 311 days.

(21) Appl. No.: 14/742,911

(22) Filed: Jun. 18, 2015

(65) Prior Publication Data

US 2015/0371011 A1 Dec. 24, 2015

(30) Foreign Application Priority Data

Jun. 23, 2014 (JP) ................................ 2014-128323
Apr. 9, 2015 (JP) ................................ 2015-080169

(51) Int. Cl.

*G06F 15/16* (2006.01)
*G06F 21/10* (2013.01)
*H04L 29/06* (2006.01)
*H04N 7/15* (2006.01)
*H04L 12/18* (2006.01)
*H04N 7/14* (2006.01)

(52) U.S. Cl.

CPC .......... *G06F 21/10* (2013.01); *H04L 12/1822* (2013.01); *H04L 12/1827* (2013.01); *H04L 65/403* (2013.01); *H04N 7/152* (2013.01); *G06F 2221/0791* (2013.01); *H04N 7/147* (2013.01)

(58) Field of Classification Search

USPC .......................................................... 709/206
See application file for complete search history.

(56) References Cited

U.S. PATENT DOCUMENTS 8,743,022 B2 6/2014 Masuda et al.
9,026,090 B2 * 5/2015 Braudes ............ H04M 3/42365 455/414.1
9,106,652 B2 * 8/2015 Albouyeh ............... H04L 63/08
9,106,657 B2 * 8/2015 Albouyeh .............. H04L 63/08
(Continued)

FOREIGN PATENT DOCUMENTS

EP 2687979 1/2014
JP 2012-108872 6/2012
JP 2013-535056 9/2013

OTHER PUBLICATIONS

Extended European Search Report dated Nov. 4, 2015.

*Primary Examiner* — Alicia Baturay
(74) *Attorney, Agent, or Firm* — IPUSA, PLLC

(57) ABSTRACT

A terminal device for sharing a display of a content with another terminal device, includes a unit configured to determine a role of an own-device, from between a first or second role, the first role for applying an operation performed on the content to the content of the other terminal device, and the second role for performing a part of the operation of the first role; a unit configured to receive a part of the operation of first role, and apply the operation to the content included in the other terminal device, when the own-device has the second role; and a unit configured to display the content included in the own-device upon applying the operation performed at the terminal device having the first role, based on information from the first role, when the own-device does not have the first role.

24 Claims, 22 Drawing Sheets

| MATERIAL IDENTIFIER | CONFERENCE IDENTIFIER | MATERIAL NAME | TYPE | URI |
|---|---|---|---|---|
| S001 | K001 | SALES MATERIAL 1 | PDF | https://10.61.52.177/doc/s001.pdf |
| S002 | K001 | SALES MATERIAL 2 | PPT | https://10.61.52.177/doc/s002.ppt |
| S003 | K002 | MARKETING MATERIAL | DOC | https://10.61.52.177/doc/s003.doc |

(56) References Cited

U.S. PATENT DOCUMENTS

| | | | |
|---|---|---|---|
| 2004/0024819 | A1 | 2/2004 | Sasaki et al. |
| 2008/0294992 | A1 | 11/2008 | Liang et al. |
| 2010/0037151 | A1* | 2/2010 | Ackerman ............. G06Q 10/10 715/753 |
| 2011/0307788 | A1 | 12/2011 | Cheung et al. |
| 2013/0147900 | A1 | 6/2013 | Weiser et al. |
| 2014/0025744 | A1 | 1/2014 | Kim et al. |
| 2015/0153996 | A1 | 6/2015 | Miki |

* cited by examiner

FIG.5

| CONFERENCE IDENTIFIER | CONFERENCE NAME | CONVENE TIME | OPERATOR IDENTIFIER | CONVENE PASSWORD |
|---|---|---|---|---|
| K001 | SALES STRATEGY CONFERENCE | 8/01/2014 09:30 | operator | eigyo1 |
| K002 | MARKETING CONFERENCE | 8/01/2014 10:00 | operator1|operator2 | market2 |

FIG.6

| MATERIAL IDENTIFIER | CONFERENCE IDENTIFIER | MATERIAL NAME | TYPE | URI |
|---|---|---|---|---|
| S001 | K001 | SALES MATERIAL 1 | PDF | https://10.61.52.177/doc/s001.pdf |
| S002 | K001 | SALES MATERIAL 2 | PPT | https://10.61.52.177/doc/s002.ppt |
| S003 | K002 | MARKETING MATERIAL | DOC | https://10.61.52.177/doc/s003.doc |

FIG.7

| QUESTIONNAIRE IDENTIFIER | MATERIAL IDENTIFIER | QUESTIONNAIRE NAME | RESPONSE SCREEN URI | TABULATION SCREEN URI |
|---|---|---|---|---|
| A001 | S001 | UNDERSTANDING LEVEL CHECK | https://10.61.52.177/answer/a001.html | https://10.61.52.177/chart/a001.html |
| A002 | S002 | QUESTIONNAIRE | https://10.61.52.177/answer/a002.html | https://10.61.52.177/chart/a002.html |
| A003 | S003 | UNDERSTANDING LEVEL CHECK | https://10.61.52.177/answer/a003.html | https://10.61.52.177/chart/a003.html |
| A004 | S003 | QUESTIONNAIRE | https://10.61.52.177/answer/a004.html | https://10.61.52.177/chart/a004.html |

FIG.8

| ROLE NAME | ROLE IDENTIFIER | PAGE SYNCHRONIZATION | HANDWRITTEN MEMO SYNCHRONIZATION | QUESTIONNAIRE START END | QUESTIONNAIRE CONNECTION DESTINATION |
|---|---|---|---|---|---|
| PRESENTER | 1 | POSSIBLE | POSSIBLE | POSSIBLE | TABULATION SCREEN URI |
| PARTICIPANT | 2 | NOT POSSIBLE | NOT POSSIBLE | NOT POSSIBLE | RESPONSE SCREEN URI |
| OPERATOR | 3 | NOT POSSIBLE | NOT POSSIBLE | POSSIBLE | TABULATION SCREEN URI |

FIG.10

```
- <message guide="26fabebc-6d61-4ed4-9c1b-958c5e035768" class="questionnaire information" to="participant" from="conference server">
  - <body>
    - <material>
        <material identifier>0</material identifier>
      - <questionnaire>
          <number of questionnaires>2</number of questionnaires>
        - <questionnaire detailed information>
            <questionnaire identifier>a123</questionnaire identifier>
            <title>vitamin quiz</title>
            <questionnaire response URI>https://10.61.52.177/answer/a123.html/</questionnaire response URI>
            <questionnaire tabulation URI>https://10.61.52.177/chart/a123.html/</questionnaire tabulation URI>
          </questionnaire detailed information>
        - <questionnaire detailed information>
            <questionnaire identifier>a124</questionnaire identifier>
            <title>observation quiz</title>
            <questionnaire response URI>https://10.61.52.177/answer/a124.html/</questionnaire response URI>
            <questionnaire tabulation URI>https://10.61.52.177/chart/a124.html/</questionnaire tabulation URI>
          </questionnaire detailed information>
        </questionnaire>
      </material>
    - <material>
        <material identifier>1</material identifier>
      - <questionnaire>
          <number of questionnaires>1</number of questionnaires>
        - <questionnaire detailed information>
            <questionnaire identifier>a200</questionnaire identifier>
            <title>lecture questionnaire</title>
            <questionnaire response URI>https://10.61.52.177/answer/a200.html/</questionnaire response URI>
            <questionnaire tabulation URI>https://10.61.52.177/chart/a200.html/</questionnaire tabulation URI>
          </questionnaire detailed information>
        </questionnaire>
      </material>
    - <role information>
      - <role>
          <identifier>1</identifier>
          <name>presenter</name>
          <URI>questionnaire tabulation URI</URI>
        </role>
      - <role>
          <identifier>2</identifier>
          <name>participant</name>
          <URI>questionnaire response URI</URI>
        </role>
      - <role>
          <identifier>3</identifier>
          <name>operator</name>
          <URI>questionnaire tabulation URI</URI>
        </role>
      </role information>
    </body>
  </message>
```

1000

1002

| OPERATOR ROLE | PRESENTER/ PARTICIPANT ROLE |
|---|---|
| 1=IS OPERATOR<br>0=IS NOT OPERATOR | 1=PRESENTER<br>0=PARTICIPANT |

FIG.17

```
- <message class="start questionnaire"from="presenter"to="conference server"guide="54eb54b5-c9a1-44cd-b568-b1318f3d665e">
    <body>123</body>
  </message>
```

FIG.23

```
- <message guide="qw0b54b5-c9a1-44cd-b568-b1318f3hgzwer"to="conference server" from="presenter" class="role information">
  - <body>
    - <roles>
      - <role>
          <role_name>operator</role_name>
          <username>operator</username>
        </role>
      - <role>
          <role_name>presenter</role_name>
          <username>ichiro</username>
        </role>
      </roles>
    </body>
  </message >
```

WHEN OPERATOR AND PRESENTER

WHEN OPERATOR AND PARTICIPANT

WHEN NOT OPERATOR BUT PRESENTER

WHEN NOT OPERATOR BUT PARTICIPANT

TERMINAL DEVICE AND INFORMATION PROCESSING SYSTEM FOR IMPLEMENTING SCREEN SHARING PROCESS BASED ON USER ROLE

BACKGROUND OF THE INVENTION

1. Field of the Invention

The present invention relates to a terminal device and an information processing system.

2. Description of the Related Art

Conventionally, there is a screen sharing service providing system for sharing a display screen in a real-time manner, among a plurality of information processing apparatuses having a communication function.

Conventionally, there is known a screen sharing service providing system, including a plurality of information processing apparatuses connected to each other via a predetermined data transmission line and displaying the same contents on their respective screens, wherein each of the information processing apparatuses includes an operation right switching unit configured to switch, among the information processing apparatuses, an operation right for performing an input operation on the shared screen displaying the same contents in response to a switching instruction entered by a user, a transmission data generating unit configured to generate transmission data including operation information of the input operation, and a drawing unit configured to draw a display object on the screen; wherein one of the information processing apparatuses, which holds the operation right that has been switched by the operation right switching unit, draws a display object by the drawing unit according to operation information of the input operation by the user, generates transmission data by the transmission data generating unit based on the operation information of the input operation by the user, and transmits the transmission data to another information processing apparatus, wherein the information processing apparatuses that have received the transmission data draws the display object by the drawing unit according to the operation information included in the reception data (see, for example, Patent Document 1).

In the conventional screen sharing system for sharing a display screen, there are cases where one role (for example, a presenter) that can perform operations with respect to the shared screen is prepared, and the role is switched among the terminal devices sharing the screen.

Patent Document 1: Japanese Laid-Open Patent Publication No. 2012-108872

SUMMARY OF THE INVENTION

The present invention provides a terminal device and an information processing system, in which one or more of the above-described disadvantages are eliminated.

According to an aspect of the present invention, there is provided a terminal device for sharing a display of a target content with another terminal device, the terminal device including a role determining unit configured to determine a role of an own-device that is the terminal device itself, from between a first role or a second role, the first role being able to apply an operation performed with respect to the target content included in the own-device to the target content included in the other terminal device, and the second role being able to perform at least a part of the operation that the first role is able to perform and apply to the other terminal device; a processing unit configured to receive, from a person performing operations, at least a part of the operation that the first role is able to perform, and apply the received operation to the target content included in the other terminal device, in a case where the determined role of the own-device is the second role; and a target content display unit configured to display the target content included in the own-device upon applying, to the target content included in the own-device, the operation performed at the terminal device having the first role, based on information sent from the terminal device having the first role, when the determined role of the own-device is not the first role, wherein the role determining unit determines whether the role of the own-device is the second role, based on device identification information for identifying a machine of the own-device and identification information of the second role.

According to an aspect of the present invention, there is provided a non-transitory computer-readable recording medium storing a program that causes a computer to execute a process, the process including determining a role of an own-device that is a terminal device itself, from between a first role or a second role, the first role being able to apply an operation performed with respect to a target content included in the own-device to the target content included in another terminal device, and the second role being able to perform at least a part of the operation that the first role is able to perform and apply to the other terminal device; receiving, from a person performing operations, at least a part of the operation that the first role is able to perform, and applying the received operation to the target content included in the other terminal device, in a case where the determined role of the own-device is the second role; and displaying the target content included in the own-device upon applying, to the target content included in the own-device, the operation performed at the terminal device having the first role, based on information sent from the terminal device having the first role, when the determined role of the own-device is not the first role, wherein the determining includes determining whether the role of the own-device is the second role, based on device identification information for identifying a machine of the own-device and identification information of the second role.

According to an aspect of the present invention, there is provided an information processing system for sharing a display of a target content among a plurality of terminal devices, the information processing system including a storage unit configured to store the target content that is a target of display sharing; and a control unit configured to send the target content that is the target of display sharing to the plurality of terminal devices, and control distribution of an instruction for sharing the display of the target content among the plurality of terminal devices, the instruction being distributed to the plurality of terminal devices, wherein each of the plurality of terminal devices includes a role determining unit configured to determine a role of an own-device that is the terminal device itself, from between a first role or a second role, the first role being able to apply an operation performed with respect to the target content included in the own-device to the target content included in another terminal device, and the second role being able to perform at least a part of the operation that the first role is able to perform and apply to the other terminal device, a processing unit configured to receive, from a person performing operations, at least a part of the operation that the first role is able to perform, and apply the received operation to the target content included in the other terminal device, in a case where the determined role of the own-device is the second role, and a target content display unit configured to display the target content included in the own-device upon applying, to the target content included in the own-device, the operation performed at the terminal device having the first role, based on information sent from the terminal device having the first role, when the determined role of the own-device is not the first role, wherein the role determining unit determines whether the role of the own-device is the second role, based on device identification information for identifying a machine of the own-device and identification information of the second role.

BRIEF DESCRIPTION OF THE DRAWINGS

Other objects, features and advantages of the present invention will become more apparent from the following detailed description when read in conjunction with the accompanying drawings, in which:

FIG. 5 is a configuration diagram of an example of conference information;

FIG. 6 is a configuration diagram of an example of material information;

FIG. 7 is a configuration diagram of an example of questionnaire information;

FIG. 8 is a configuration diagram of an example of role information;

FIG. 10 is a configuration diagram of an example of questionnaire information received by the conference client device;

FIG. 17 is a configuration diagram of an example of a questionnaire start instruction;

FIG. 23 is a configuration diagram of an example of role determining information;

DETAILED DESCRIPTION OF THE PREFERRED EMBODIMENTS

A detailed description is given of embodiments of the present invention. In the example described below, there are roles of a presenter, a participant, and an operator. The operator is a role that can perform at least part of the operations that can be performed by the presenter. Note that the names of the roles of the presenter, the participant, and the operator are merely examples; there may be roles of other names.

First Embodiment

<System Configuration>

Figure 1:
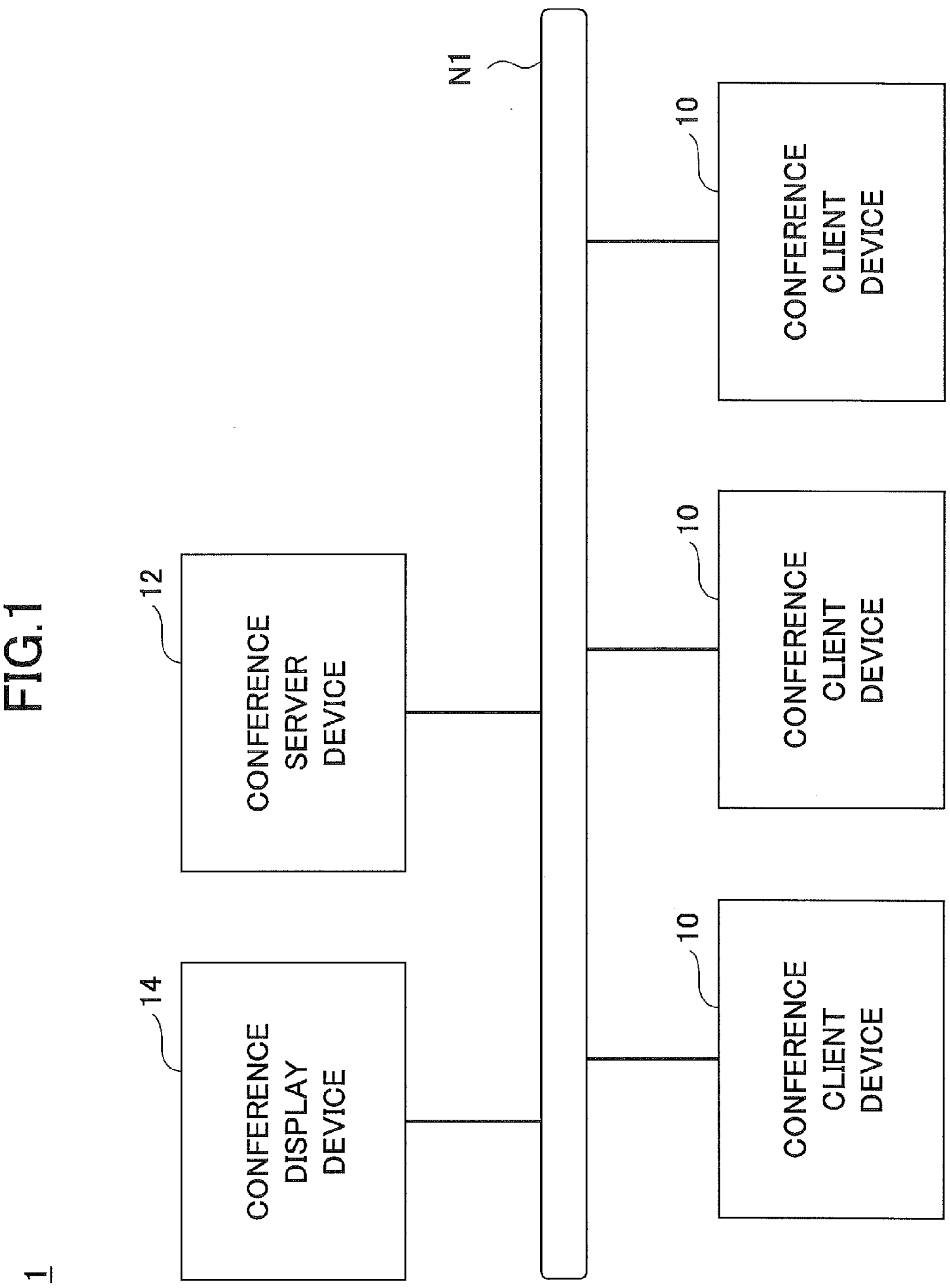
FIG. 1 is a configuration diagram of an example of a conference system according to an embodiment.

FIG. 1 is a configuration diagram of an example of a conference system according to the present embodiment. An example of a conference system 1 illustrated in FIG. 1 includes a plurality of conference client devices 10, a conference server device 12, and a conference display device 14, which are connected to a network N1 such as a LAN.

The conference server device 12 has functions of managing conference information, conference materials, etc., convening a conference, controlling participation, and distributing, in a real-time manner, the input operations of the presenter and the operator, to the conference client devices 10 that are participating.

The conference server device 12 is realized by software and services operating in a single computer. Furthermore, the conference server device 12 may be software and services operating in a plurality of computers. Furthermore, the conference server device 12 has a mode of, for example, a so-called cloud service. Note that the conference server device 12 may be realized by various hardware configurations, as long as the conference server device 12 has a conference service function.

The conference client device 10 has functions of acquiring conference information, conference materials, etc., from the conference server device 12, receiving operations needed for the progress of the conference from the person performing operations such as the presenter, the operator, and the participant of the conference, and displaying the conference materials to be browsed. The person performing operations such as the presenter, the operator, and the participant of the conference is able to participate in the conference from the conference client device 10.

The conference client device 10 may be a PC, a tablet terminal, a smartphone, a mobile phone, a mobile information terminal such as a PDA, a terminal exclusively used for conferences, an electronic whiteboard, and an image forming apparatus such as a MFP and a printer. While the conference client device 10 is participating in the conference, the conference client device 10 receives input operations of the presenter and the operator in a real-time manner from the conference server device 12, and shares a display device with other conference client devices 10.

Note that one of the conference client devices 10 can be operated by the presenter to request the conference server device 12 to start the conference and end the conference. The conference client device 10 can be switched between the two modes of a sharing mode and an individual mode. For example, in the sharing mode, the conference material displayed on the screen of the conference client device 10 of the participant is displayed in synchronization with the conference material displayed on the screen of the conference client device 10 of the presenter, along with the progress of the conference lead by the presenter or the operator. The synchronized display includes, for example, a page display of the conference material, a display of writing (handwritten memo) in the conference material, and a display of a pointer to the conference material.

Furthermore, in the individual mode, the conference material displayed in the screen may be freely displayed (asynchronous display), regardless of the progress of the conference lead by the presenter and the operator, and without synchronizing with the conference material in the screen of the conference client device 10 of the presenter. The conference material is an example of a target content for receiving input operations from the presenter or the operator (for example, changing the display page and adding a handwritten memo).

The conference display device 14 is an example of an output device for displaying the conference material on a large screen to be browsed, and is installed in, for example, a conference room. The conference display device 14 may be a display device such as a white board and a projection device such as a projector.

Note that the conference system 1 in FIG. 1 is one example, and does not necessarily need to include all of the devices illustrated in FIG. 1. For example, the conference system 1 may have a configuration in which the functions of the conference server device 12 are performed by one or more conference client devices 10 instead. Furthermore, the conference system 1 may have a configuration without the conference display device 14.

Furthermore, in the conference system 1, part of the functions of the conference server device 12 may be realized by another device. For example, the conference system 1 may have a configuration including a questionnaire server device for realizing a function relevant to a questionnaire of the conference server device 12.

<Hardware Configuration>

Figure 2:
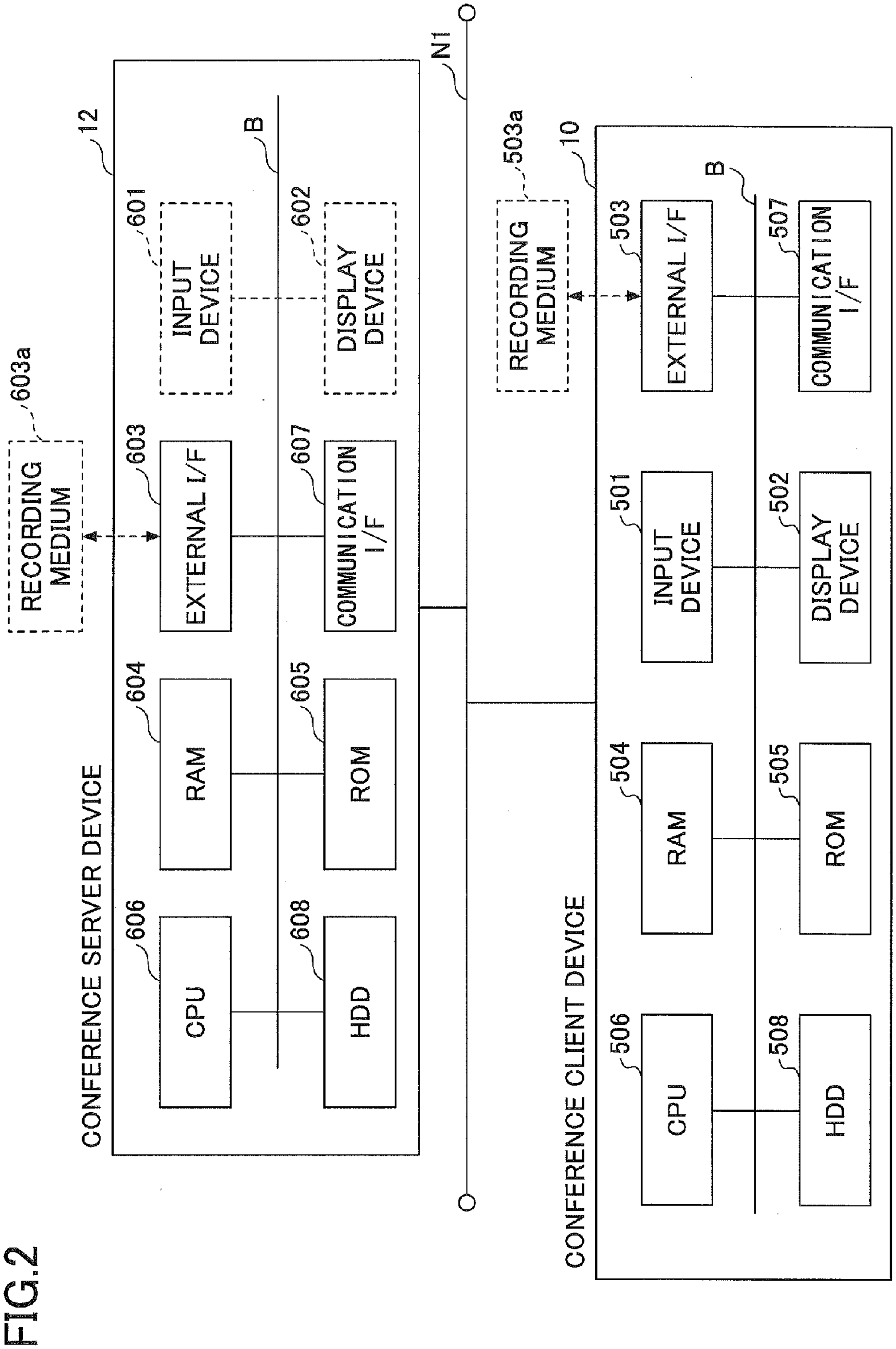
FIG. 2 is a hardware configuration diagram of examples of computers constituting the conference system according to an embodiment.

The conference client device 10 and the conference server device 12 are realized by a hardware configuration, for example, as illustrated in FIG. 2.

FIG. 2 is a hardware configuration diagram of examples of computers constituting the conference system according to the present embodiment. The conference client device 10 illustrated in FIG. 2 includes an input device 501, a display device 502, an external I/F 503, a RAM 504, a ROM 505, a CPU 506, a communication I/F 507, a HDD 508, etc., which are interconnected by a bus B. Note that the conference client device 10 may have a configuration including a camera, a microphone, a speaker, etc.

The input device 501 includes a keyboard, a mouse, a touch panel, etc., and is used for inputting various operation signals in the conference client device 10. Furthermore, the display device 502 includes a display, etc., and displays the processing results by the conference client device 10. The communication I/F 507 is an interface for connecting the conference client device 10 to the network N1. The conference client device 10 is able to perform data communication with the conference server device 12 via the communication I/F 507.

The HDD 508 is a non-volatile storage device storing programs and data. The stored programs and data include an OS that is the basic software for controlling the entire conference client device 10, and application software for providing various functions on the OS. Furthermore, the HDD 508 manages the stored programs and data by a predetermined file system and/or a DB.

The external I/F 503 is an interface between the conference client device 10 and an external device. An example of an external device is a recording medium 503*a*. Accordingly, the conference client device 10 is able to read and/or write data in the recording medium 503*a* via the external I/F 503. Examples of the recording medium 503*a* are a flexible disk, a CD, a DVD, a SD memory card, a USB memory, etc.

The ROM 505 is a non-volatile semiconductor memory (storage device) that can store programs and data even after the power is turned off. The ROM 505 stores programs and data such as a BIOS that is executed when the conference client device 10 is activated, OS settings, and network settings. The RAM 504 is a volatile semiconductor memory for temporarily storing programs and data.

The CPU 506 is a processor for realizing control and functions of the entire conference client device 10, by loading programs and data from storage devices such as the ROM 505 and the HDD 508 into the RAM 504, and executing processes.

The conference client device 10 can realize various processes as described below, for example, by executing programs by the above hardware configuration.

The conference server device 12 illustrated in FIG. 2 includes an input device 601, a display device 602, an external I/F 603, a RAM 604, a ROM 605, a CPU 606, a communication I/F 607, a HDD 608, etc., which are interconnected by a bus B. Note that the input device 601 and the display device 602 may have a mode of being connected and used when needed.

The input device 601 includes a keyboard and a mouse, and is used for inputting various operation signals in the conference server device 12. The display device 602 includes a display, etc., and displays the processing results by the conference server device 12.

The communication I/F 607 is an interface for connecting the conference server device 12 to the network N1. The conference server device 12 is able to perform data communication with the conference client device 10 via the communication I/F 607.

The HDD 508 is a non-volatile storage device storing programs and data. The stored programs and data include an OS that is the basic software for controlling the entire conference server device 12, and application software for providing various functions on the OS. Furthermore, the HDD 608 manages the stored programs and data by a predetermined file system and/or a DB.

The external I/F 603 is an interface between the conference server device 12 and an external device. An example of an external device is a recording medium 603*a*. Accordingly, the conference server device 12 is able to read and/or write data in the recording medium 603*a* via the external I/F 603. Examples of the recording medium 603*a* are a flexible disk, a CD, a DVD, a SD memory card, a USB memory, etc.

The ROM 605 is a non-volatile semiconductor memory (storage device) that can store programs and data even after the power is turned off. The ROM 605 stores programs and data such as a BIOS that is executed when the conference server device 12 is activated, OS settings, and network settings. The RAM 604 is a volatile semiconductor memory for temporarily storing programs and data.

The CPU 606 is a processor for realizing control and functions of the entire conference server device 12, by loading programs and data from storage devices such as the ROM 605 and the HDD 608 into the RAM 604, and executing processes.

The conference server device 12 can realize various processes as described below, for example, by executing programs by the above hardware configuration.

<Software Configuration>

The conference client device 10 and the conference server device 12 of the conference system 1 according to the present embodiment are realized by, for example, the following functional blocks. Note that the following functional blocks indicate configurations necessary for the explanation, and configurations unnecessary for the explanation are appropriately omitted.

<<Conference Client Device>>

Figure 3:
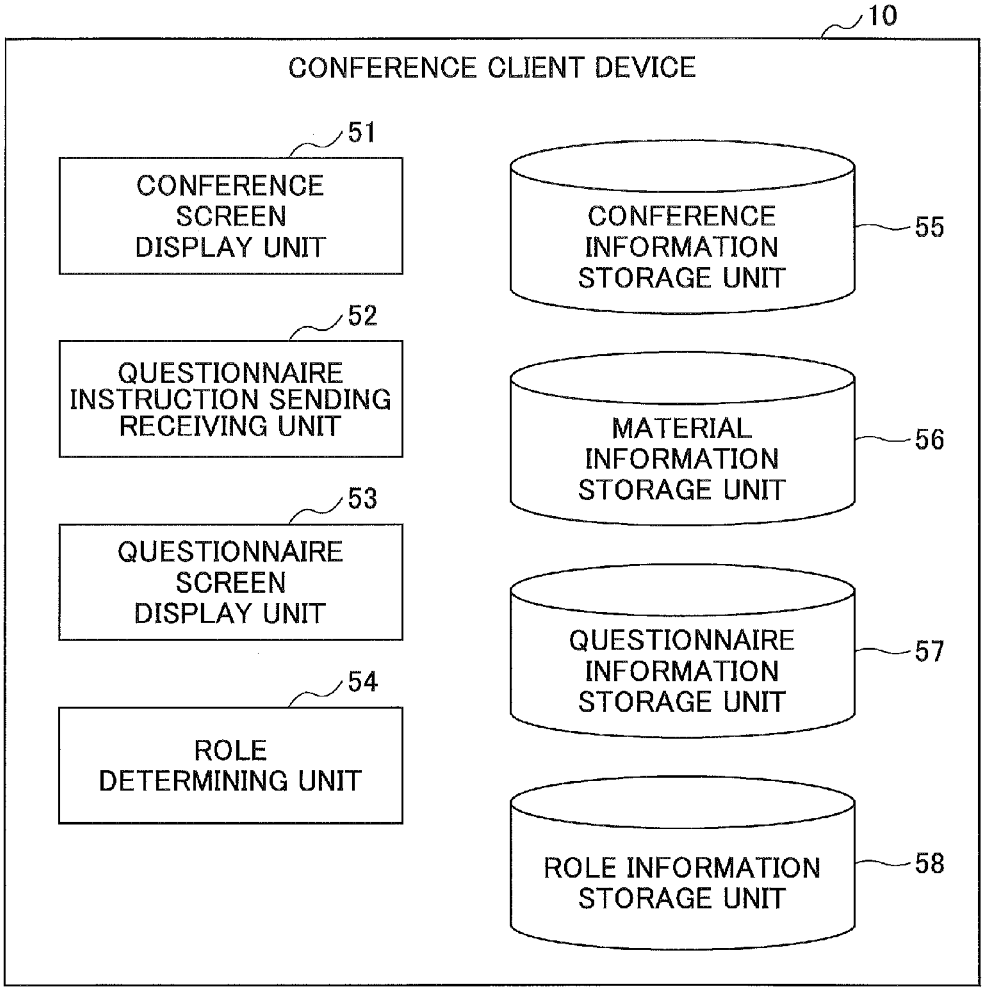
FIG. 3 is a functional block diagram of an example of a conference client device.

The conference client device 10 is realized by functional blocks, for example, as illustrated in FIG. 3. FIG. 3 is a functional block diagram of an example of a conference client device 10. The conference client device 10 illustrated in FIG. 3 realizes, by executing programs, a conference screen display unit 51, a questionnaire instruction sending receiving unit 52, a questionnaire screen display unit 53, and a role determining unit 54. Furthermore, the conference client device 10 realizes, by executing programs, a conference information storage unit 55, a material information storage unit 56, a questionnaire information storage unit 57, and a role information storage unit 58. The programs executed in the conference client device 10 are, for example, applications installed in the conference client device 10.

The conference screen display unit 51 displays conference materials by using conference information, conference materials, etc., acquired from the conference server device 12. The conference screen display unit 51 receives various operations from the person performing operations such as the presenter, the operator, and the participant of the conference, and displays a conference screen according to the operations.

The questionnaire instruction sending receiving unit 52 generates a questionnaire start instruction when an instruction to start the questionnaire is received from the person performing operations or the operator, having the questionnaire start authority, and sends the questionnaire start instruction to the conference server device 12. The questionnaire start instruction sent to the conference server device 12 is distributed to other conference client devices 10 participating in the same conference as the conference client device 10 that has sent the questionnaire start instruction. The questionnaire instruction sending receiving unit 52 receives the questionnaire start instruction distributed from the conference server device 12.

As described below, the questionnaire screen display unit 53 of the conference client device 10 that has received the questionnaire start instruction, displays a questionnaire screen according to the role (for example, the presenter, the operator, and the participant) of the person performing operations. The role determining unit 54 determines the role of the person performing operations.

The conference information storage unit 55 stores conference information received from the conference server device 12. The material information storage unit 56 stores material information received from the conference server device 12. The questionnaire information storage unit 57 stores questionnaire information received from the conference server device 12. Furthermore, the role information storage unit 58 stores role information received from the conference server device 12. Note that details of the conference information, the material information, the questionnaire information, and the role information are described below.

<<Conference Server Device>>

Figure 4:
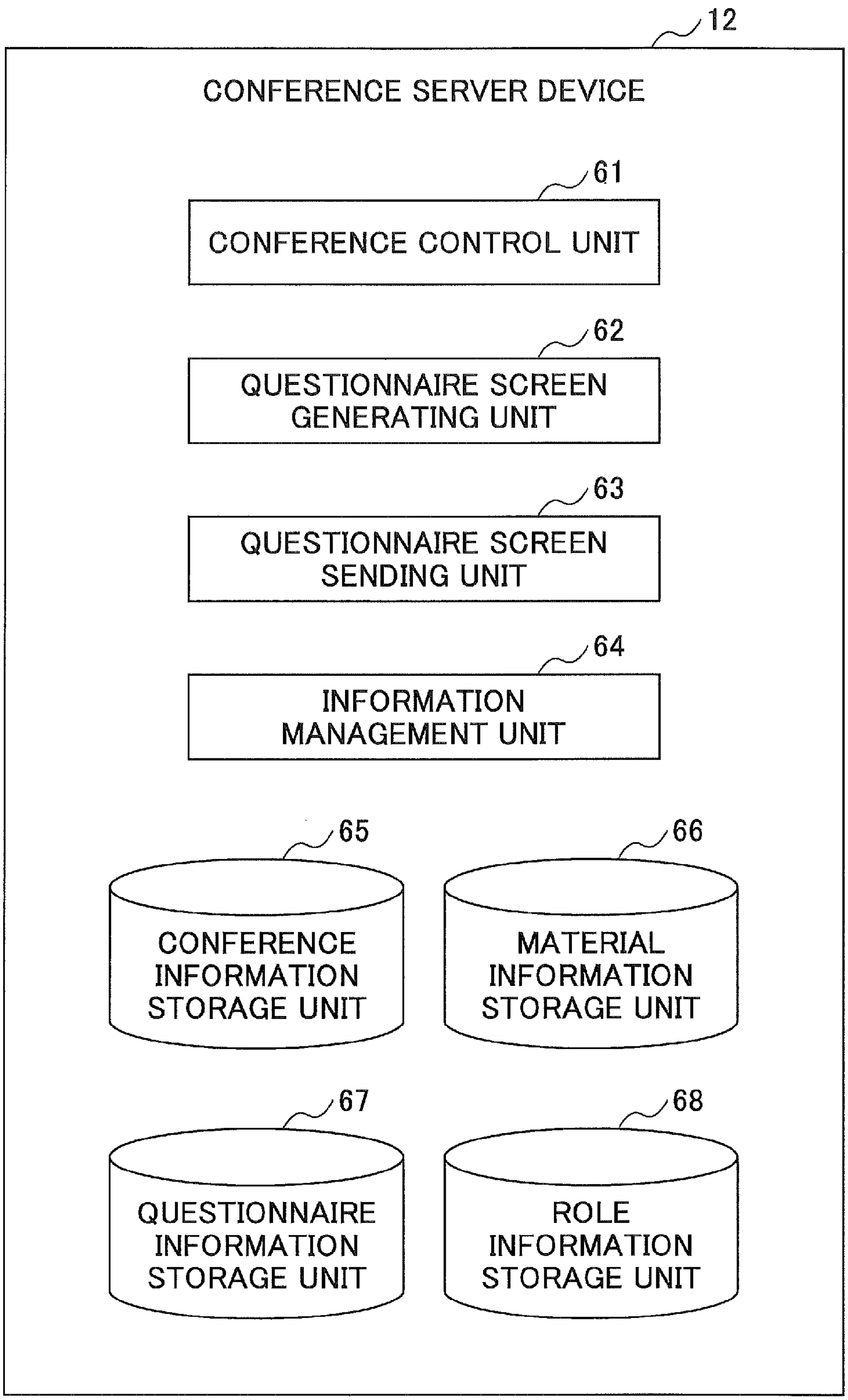
FIG. 4 is a functional block diagram of an example of a conference server device.

The conference server device 12 is realized by functional blocks, for example, as illustrated in FIG. 4. FIG. 4 is a functional block diagram of an example of a conference server device 12. The conference server device 12 realizes, by executing programs, a conference control unit 61, a questionnaire screen generating unit 62, a questionnaire screen sending unit 63, an information management unit 64, a conference information storage unit 65, a material information storage unit 66, a questionnaire information storage unit 67, and a role information storage unit 68.

The conference control unit 61 provides functions, etc., for convening a conference, controlling participation, and distributing input operations of the presenter and the operator in a real-time manner, to the participating conference client devices 10. The questionnaire screen generating unit 62 generates a questionnaire screen according to the role of the person performing operations of the conference client device 10. The questionnaire screen sending unit 63 sends a questionnaire screen according to the role of the person performing operations of the conference client device 10, to the conference client devices 10. The information management unit 64 manages the conference information, the material information, the questionnaire information, the role information, etc.

Furthermore, the conference information storage unit 65 stores conference information. The material information storage unit 66 stores material information. The questionnaire information storage unit 67 stores questionnaire information. Furthermore, the role information storage unit 68 stores role information. Note that details of the conference information, the material information, the questionnaire information, and the role information are described below.

<<Data Configuration>>

FIG. 5 is a configuration diagram of an example of conference information. The conference information illustrated in FIG. 5 includes items of a conference identifier, a conference name, a convene time, an operator identifier, and a convene password. The conference identifier is identification information for uniquely identifying a conference. A conference ID is an example of a conference identifier. The conference name is the name of the conference. The convene time is the time and date when the conference is to be started.

The operator identifier is identification information used for determining whether the person performing operations is an operator, in the conference client device 10. An operator ID is an example of an operator identifier. The convene password is an example of authentication information needed to convene and participate in a conference.

FIG. 6 is a configuration diagram of an example of material information. The material information illustrated in FIG. 6 includes items of a material identifier, a conference identifier, a material name, the type, and a URI. The material identifier is identification information for uniquely identifying conference material. A material ID is an example of a material identifier. The conference identifier is identification information for uniquely identifying a conference. The material name is the name of the conference material. The type is the data format of the conference material. The URI is information indicating the storage location of the data of the conference material.

FIG. 7 is a configuration diagram of an example of questionnaire information. The questionnaire information illustrated in FIG. 7 includes items of a questionnaire identifier, a material identifier, a questionnaire name, a response screen URI, and a tabulation screen URI.

The questionnaire identifier is identification information for uniquely identifying the questionnaire. A questionnaire ID is an example of the questionnaire identifier. The material identifier is identification information for uniquely identifying the conference material. The questionnaire name is the name of the questionnaire. The response screen URI and the tabulation screen URI express the connection destinations in a case of displaying the questionnaire screen according to the role of the person performing operations of the conference client device 10. For example, the response screen URI is the connection destination in a case of displaying the questionnaire response screen for responding to the questionnaire, when the role of the person performing operations is a participant. The tabulation screen URI is the connection destination in a case of displaying the questionnaire tabulation screen for adding up the responses to the questionnaire, when the role of the person performing operations is a presenter or an operator.

FIG. 8 is a configuration diagram of an example of role information. The role information illustrated in FIG. 8 includes items of a role name, a role identifier, page synchronization, handwritten memo synchronization, questionnaire start end, and questionnaire connection destination.

The role name is the name of the role. In the role information of FIG. 8, a presenter, a participant, and an operator are provided as roles. The role identifier is identification information for uniquely identifying the role. A role ID is an example of a role identifier.

Page synchronization, handwritten memo synchronization, and questionnaire start end express the operations that the person performing operations of the conference having the role is able to perform (authority). For example, the person performing operations having a role of a presenter is able to perform the operations of page synchronization, handwritten memo synchronization, and questionnaire start end. Furthermore, the person performing operations having a role of a participant is unable to perform the operations of page synchronization, handwritten memo synchronization, or questionnaire start end. The person performing operations having a role of an operator is able to perform the operations of questionnaire start end.

FIG. 8 illustrates an example of role information in a case where the operator is able to perform the operation of questionnaire start end, which is part of the operations that the presenter is able to perform, i.e., page synchronization, handwritten memo synchronization, and questionnaire start end. As a matter of course, in another example, the operator may be able to perform all of the operations that the presenter is able to perform.

The questionnaire connection destination is information expressing whether the questionnaire screen according to the role of the person performing operations is a questionnaire response screen or a questionnaire tabulation screen. In the role information of FIG. 8, when the role of the person performing operations is the presenter or the operator, the questionnaire screen according to the role of the person performing operations becomes the questionnaire tabulation screen. Furthermore, in the role information of FIG. 8, when the role of the person performing operations is the participant, the questionnaire screen according to the role of the person performing operations becomes the questionnaire response screen. As described above, the role information associates the role of the person performing operations with the connection destination when displaying a questionnaire screen.

As illustrated in FIGS. 5 and 6, the conference information and the material information are associated with each other by a conference identifier. Therefore, the conference material used in the conference can be identified by the conference information and the material information.

Furthermore, as illustrated FIGS. 6 and 7, the material information and the questionnaire information are associated with other by a material identifier. Therefore, the questionnaire information used when the conference material is displayed, can be identified by material information and questionnaire information.

Furthermore, as illustrated in FIGS. 7 and 8, the connection destination when displaying a questionnaire screen according to the role of the person performing operations of the conference client device 10, can be identified by questionnaire information and role information.

Note that in the example of the questionnaire information of FIG. 7, two connection destinations are indicated as connection destinations when displaying a questionnaire screen according to the role of the person performing operations; however, there may be three or more destinations. Furthermore, in the example of the role information of FIG. 8, three roles are indicated as roles of the person performing operations; however, there may be four or more roles.

For example, as another example of the roles of the person performing operations, the facilitator, the presenter, and the participant of the conference, may be set. The facilitator of the conference is able to perform an operation of determining the presenter of the conference and the conference material, and is able to perform at least part of the operations that the presenter is able to perform.

Furthermore, the presenter is able to perform paging of the material (page synchronization), handwriting a memo (handwritten memo synchronization), enlargement and reduction (enlargement reduction synchronization), etc. The participant is able to browse the conference material.

In the following, a description is given of an example where there are the three roles of a presenter, a participant, and an operator, in the conference system 1 according to the present embodiment. Note that it is assumed that the role of the presenter and the participant may be switched during the conference. Furthermore, in the conference system 1, when there are a plurality of conference client devices 10 participating in the same conference, among the plurality of conference client devices 10, one conference client device 10 has the role of the presenter and one or more conference client devices 10 have the roles of the operator and the participant. For example, when the role of the presenter and the participant switches during the conference, the role of the conference client device 10 that has been assuming the role of a presenter changes to a participant, and the role of the conference client device 10 that is to assume the role of the new presenter becomes the presenter.

Figure 16:
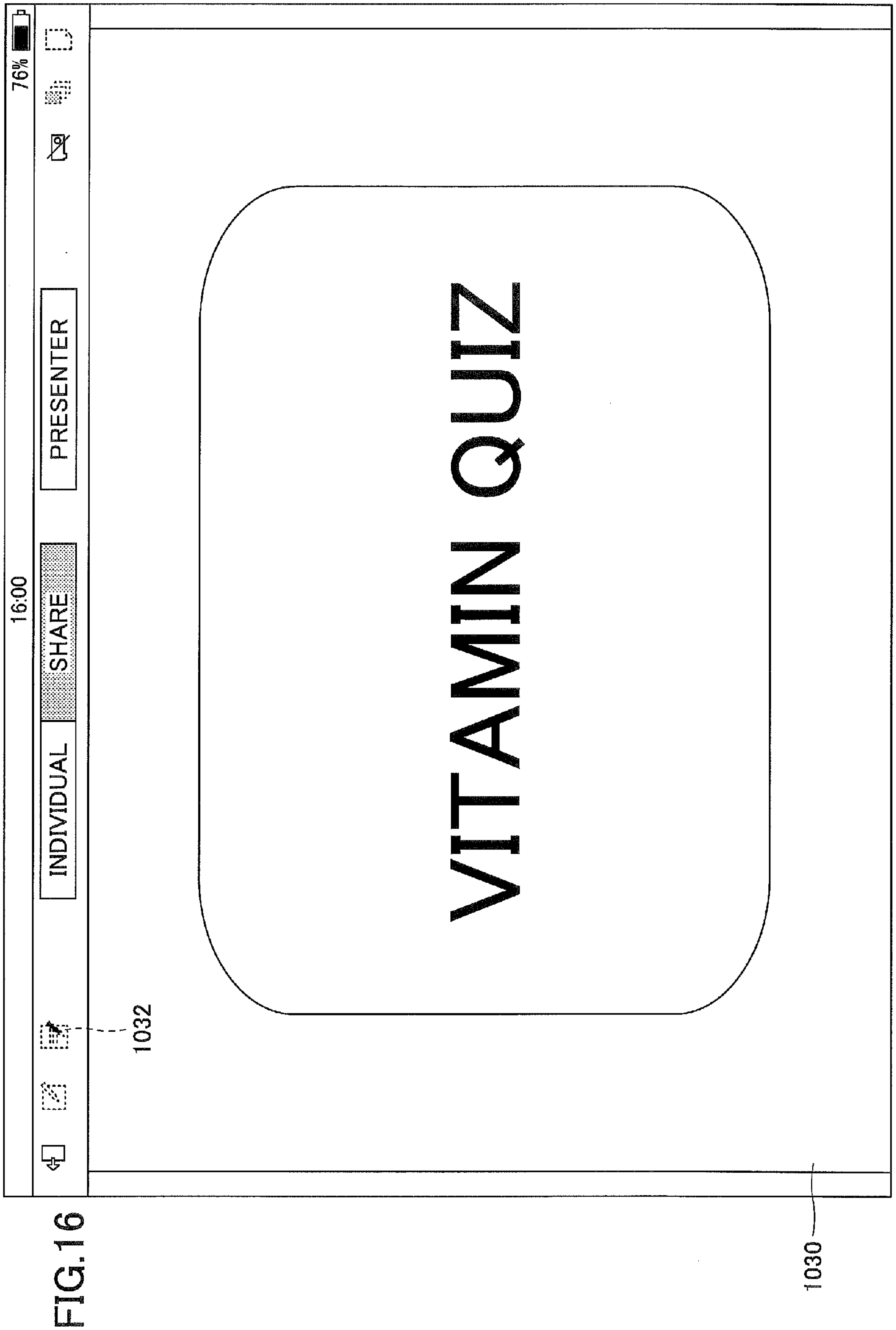
FIG. 16 is an image diagram of an example of a conference screen of the participant.

For example, the role may be changed from the participant to the presenter when the participant selects a presenter button indicated in a screen of FIG. 16 described below; or the role may be changed from the participant to the presenter when the presenter specifies a participant or the conference client device 10 of a participant to become the next presenter.

<Details of Process>

In the following, details are described of the process of the conference system 1 according to the present embodiment.

<<Conference Participation Process>>

Figure 9:
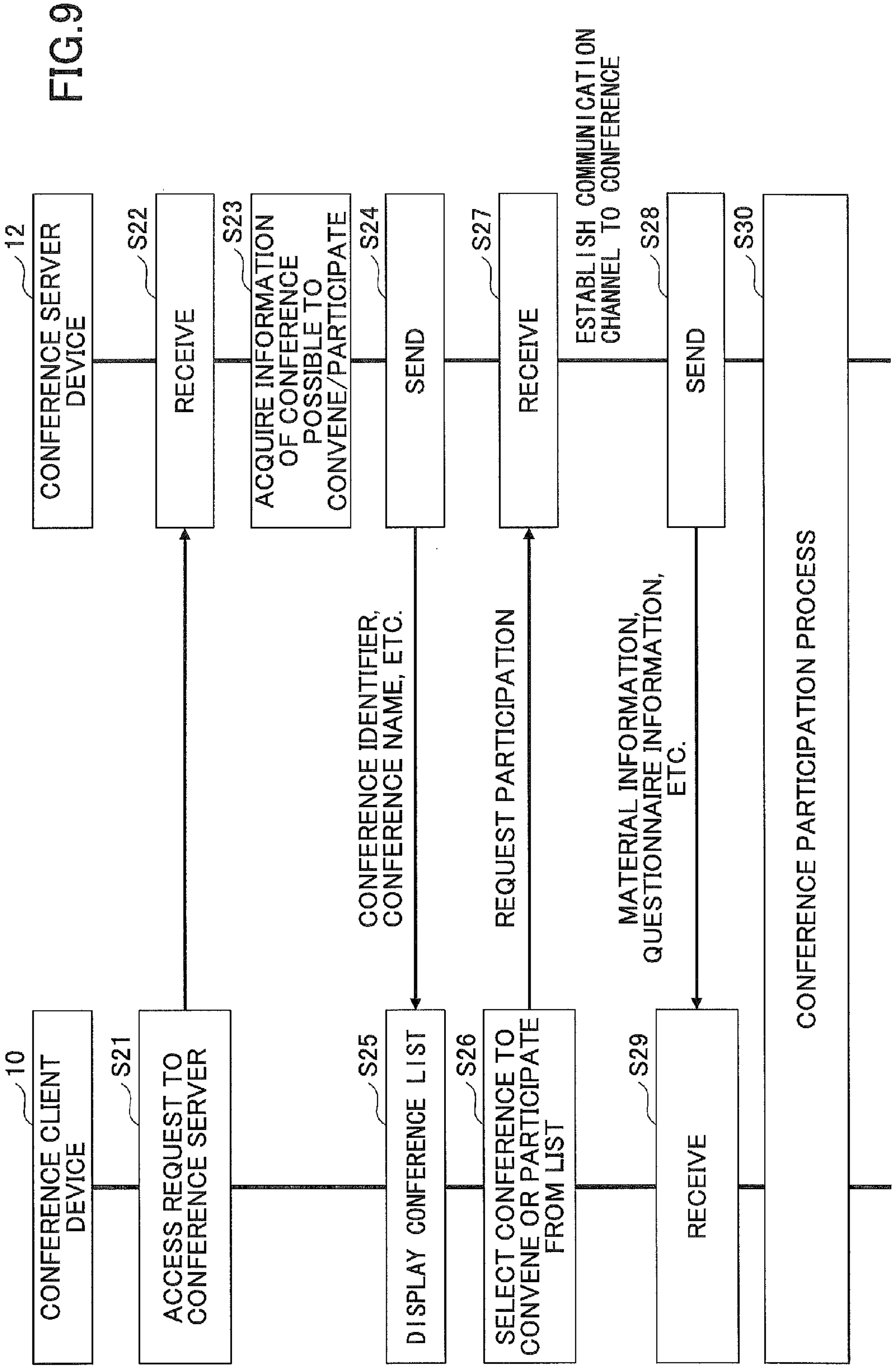
FIG. 9 is a flowchart of an example of a conference participation process.

FIG. 9 is a flowchart of an example of a conference participation process. The presenter, the operator, and the participant of the conference operates the conference client device 10, and requests to access the conference participation screen of the conference server device 12. The conference screen display unit 51 of the conference client device 10 makes a conference information acquisition request by, for example, accessing a URI, etc., of the conference participation screen of the conference server device 12 (step S21).

In step S22, the conference control unit 61 of the conference server device 12 receives the conference information acquisition request from the conference client device 10. In step S23, the information management unit 64 acquires conference information of conferences that can be convened or participated in from the conference information storage unit 65, based on the conference information acquisition request received from the conference client device 10. Then, in step S24, the conference control unit 61 sends the conference information of conferences that can be presently convened or participated in, to the conference client device 10.

In step S25, the conference screen display unit 51 of the conference client device 10 displays a conference participation screen on the display device 502, based on the received conference information. The conference participation screen includes a conference list based on the conference information indicating the conferences that can be convened or participated in.

In step S26, the presenter, the operator, or the participant of the conference selects the conference to be convened or participated in, from the conference list in the conference participation screen. The conference screen display unit 51 of the conference client device 10 makes a request to participate in the conference selected by the presenter, the operator, or the participant of the conference, to the conference server device 12.

In step S27, the conference control unit 61 of the conference control unit 61 establishes a communication line (session) with the conference client device 10, based on the participation request from the conference client device 10. The conference server device 12 and the conference client device 10 participating in the conference exchange information needed for sharing the conference screen, by using the established communication line (session).

As described above, conference server device 12 and the conference client device 10 participating in the conference use the established communication line (session) to distribute, in a real-time manner, messages indicating the input operations to the conference client device 10 of the presenter and the operator via the conference server device 12, and realizes the sharing of the conference screen. As a typical example of a protocol for distributing messages in a real-time manner by using such a communication line (session), there is a protocol referred to as XMPP. Input operations to the conference client device 10 of the presenter are, for example, paging of the material, an instruction to start a questionnaire, and an instruction to end the questionnaire. Note that as a typical example of the communication line for displaying the questionnaire screen described below, there is the protocol of HTTPS (Hypertext Transfer Protocol Secure). Note that the questionnaire screen is described in HTML (HyperText Markup Language).

XMPP is standardized by IETF as RFC3920 (Extensible Messaging and Presence Protocol: Core), RFC3921 (Extensible Messaging and Presence Protocol: Instant Messaging and Presence), and the extended specifications are documented as XEP.

In XMPP, a service called group chat (Multi-User Chat [XEP-0045]) can be provided. Group chat is a function in which, when the conference client device 10 participating in the conference room (room) provided by XMPP sends a message to the conference server device 12, the message is distributed from the conference server device 12 to all conference client devices 10 participating in the conference room. As the communication line for such a function, methods such as BOSH that is an extension of XMPP, a protocol such as WebSocket, and a method such as Commet may be used, other than XMPP.

BOSH (Bidirectional-streams Over Synchronous HTTP) [XEP-0206] is a technique for transmitting and receiving messages by HTTP in XMPP. These protocols can realize a push function from the conference server device 12. A push function is a function for sending information in an asynchronous manner from the conference server device 12 to the conference client device 10, and receiving the information at the conference client device 10, instead of sending the information upon receiving a request from the conference client device 10. Note that a similar function may be realized in general HTTP communications, by periodically acquiring information from the conference client device 10.

In step S28, the conference control unit 61 of the conference server device 12 sends, as a response to the participation request, the above-described material information, questionnaire information, and role information, to the conference client device 10. In the case where after conference has started, in step S28, the information of the conference material and information of the page of the conference material presently being displayed, and information of the presenter may be included.

In step S29, the conference screen display unit 51 of the conference client device 10 receives the above-described material information, questionnaire information, and role information. In step S30, the conference screen display unit 51 performs a conference participation process. The conference participation process is a process of acquiring the data of the conference material of the conference to be participated in, from the storage location of data of the conference material indicated by the URI of the material information, and displaying the data on the conference screen.

Note that in step S28, the questionnaire information is sent from the conference server device 12 to the conference client device 10 in a configuration as illustrated in, for example, FIG. 10. FIG. 10 is a configuration diagram of an example of questionnaire information received by the conference client device 10. The questionnaire information includes information needed for displaying the questionnaire screen.

For example, in FIG. 10, a part 1000 describing the number of questionnaires and one or more questionnaire detailed information items is included, as information needed for displaying questionnaire screens that are respectively associated with two conference materials. The questionnaire detailed information items include a questionnaire identifier, a title, a questionnaire response URI, and a questionnaire tabulation URI.

Note that the questionnaire identifier, the title, the questionnaire response URI, and the questionnaire tabulation URI, which are the questionnaire detailed information items, correspond to the questionnaire identifier, the questionnaire name, the response screen URI, and the tabulation screen URI in the questionnaire information of FIG. 7. As described above, the part 1000 of the questionnaire information can be generated based on the questionnaire information of FIG. 7.

Furthermore, FIG. 10 includes a part 1002 that associates the role of the conference client device 10 with the questionnaire tabulation URI and the questionnaire response URI. Note that the role of the conference client device 10, the questionnaire tabulation URI, and the questionnaire response URI correspond to the role, the tabulation screen URI, and the response screen URI of the role information in FIG. 8. As described above, the part 1002 of the questionnaire information of FIG. 10 can be generated based on the role information of FIG. 8.

<<Role Determination in Conference Client Device 10>>

Figures 11, 12:
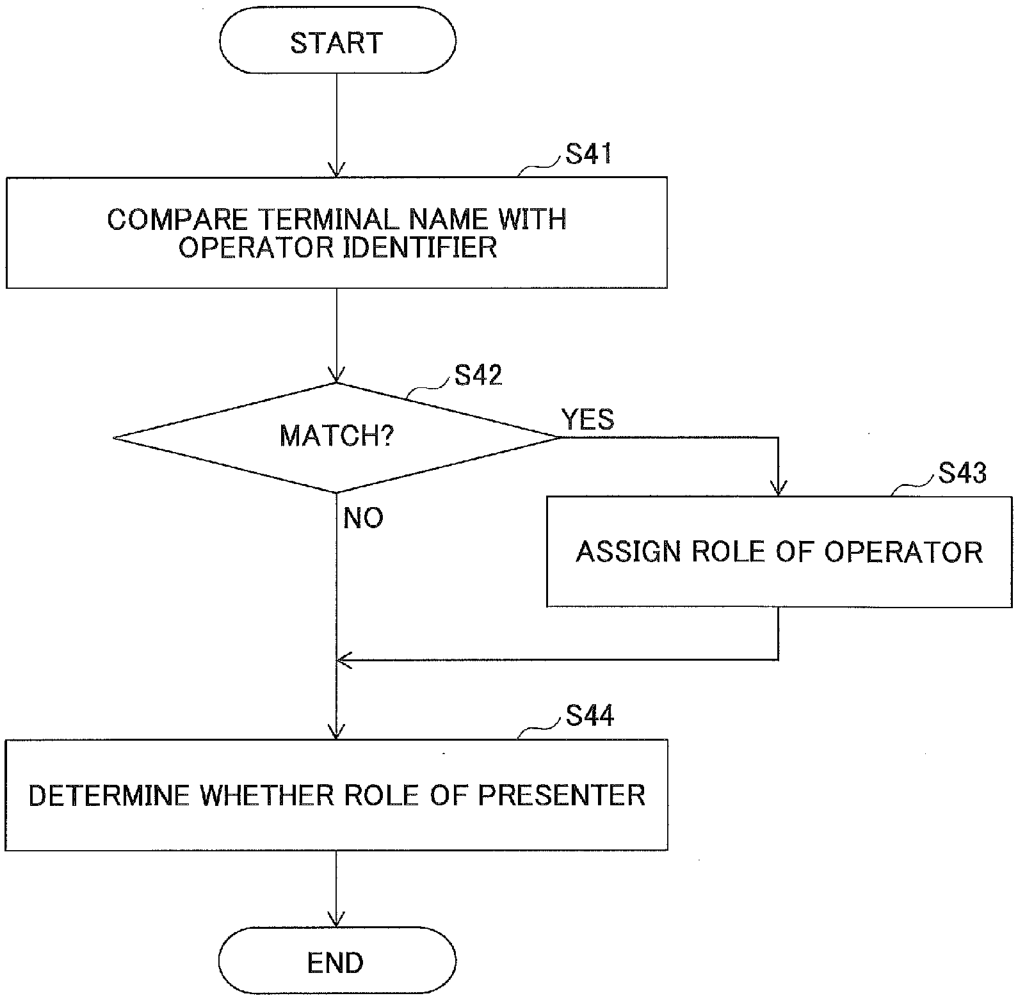
FIG. 11 is as flowchart of an example of a role determining process.
FIG. 12 is a configuration diagram of an example of a role table.

The role determining unit 54 in each conference client device 10 performs a role determining process as illustrated in FIG. 11, and determines the role of the own-device (the device itself). Note that the role determining process is performed when participating in the conference, when the terminal name of the own-device has changed, or when an instruction to change the role is received during the conference.

FIG. 11 is as flowchart of an example of a role determining process. In step S41, the role determining unit 54 of the conference client device 10 compares the operator identifier included in the conference information of FIG. 5 with the terminal name of the own-device.

In step S42, when the operator identifier included in the conference information of FIG. 5 matches the terminal name of the own-device, the role determining unit 54 proceeds to step S43, assigns the role of the operator of the own-device, and the proceeds to step S44. Furthermore, when the operator identifier included in the conference information does not match the terminal name of the own-device, the role determining unit 54 skips step S43 and proceeds to step S44. In step S44, the role determining unit 54 determines whether the role is the presenter, and assigns the role of the presenter or the participant to the own-device.

Note that the role determining unit 54 manages the determine role of the own-device by a role table as illustrated in FIG. 12. FIG. 12 is a configuration diagram of an example of a role table. The role table of FIG. 12 is constituted by information indicating whether the own-device is an operator, and information indicating whether the own-device is a presenter or a participant.

As indicated in the role table of FIG. 12, each conference client device 10 manages the role of the own-device by the information indicating whether the own-device is an operator, and information indicating whether the own-device is a presenter or a participant.

In the role table of FIG. 12, when the information indicating whether the own-device is an operator (operator role) is "1", the role becomes the operator, regardless of the information indicating whether the own-device is a presenter or a participant (presenter/participant role). Furthermore, in the role table of FIG. 12, when the operator role is "0", the role becomes the presenter or the participant according to the presenter/participant role.

Note that during the conference, the conference client device 10 can assign the role of the presenter, by sending an XMPP message of changing the role to the conference server device 12. The conference server device 12 distributes, to the conference client devices 10 participating in the conference, the XMPP message of changing the role from the conference client device 10, to cause the conference client devices 10 to update their role tables.

In the flowchart of FIG. 11, a description is given of an example of comparing the operator identifier with the terminal name of the own-device; however, the operator identifier is not limited to being compared with the terminal name, but the operator identifier may be compared with other information unique to the device such as a MAC address, an IP address, a machine number, and a user name. However, by using a terminal name and a user name that can be changed (variable), the conference client device 10 can freely switch between a state of being an operator and a state of not being an operator. Note that a regular expression may be used as the operator identifier. Furthermore, when a MAC address or a machine number, which cannot be changed (invariable), the role determination of the operator may be performed when participating in the conference.

Furthermore, the present embodiment indicates an example in which the operator identifier is included in the conference information; however, the operator identifier may be included in the questionnaire information or in other information associated with the conference. The information in which the operator identifier is to be included, may be determined, for example, according to the range of the operations of the presenter that are to be performed by operator in place of the presenter.

<<Questionnaire Start Process>>

Figure 13:
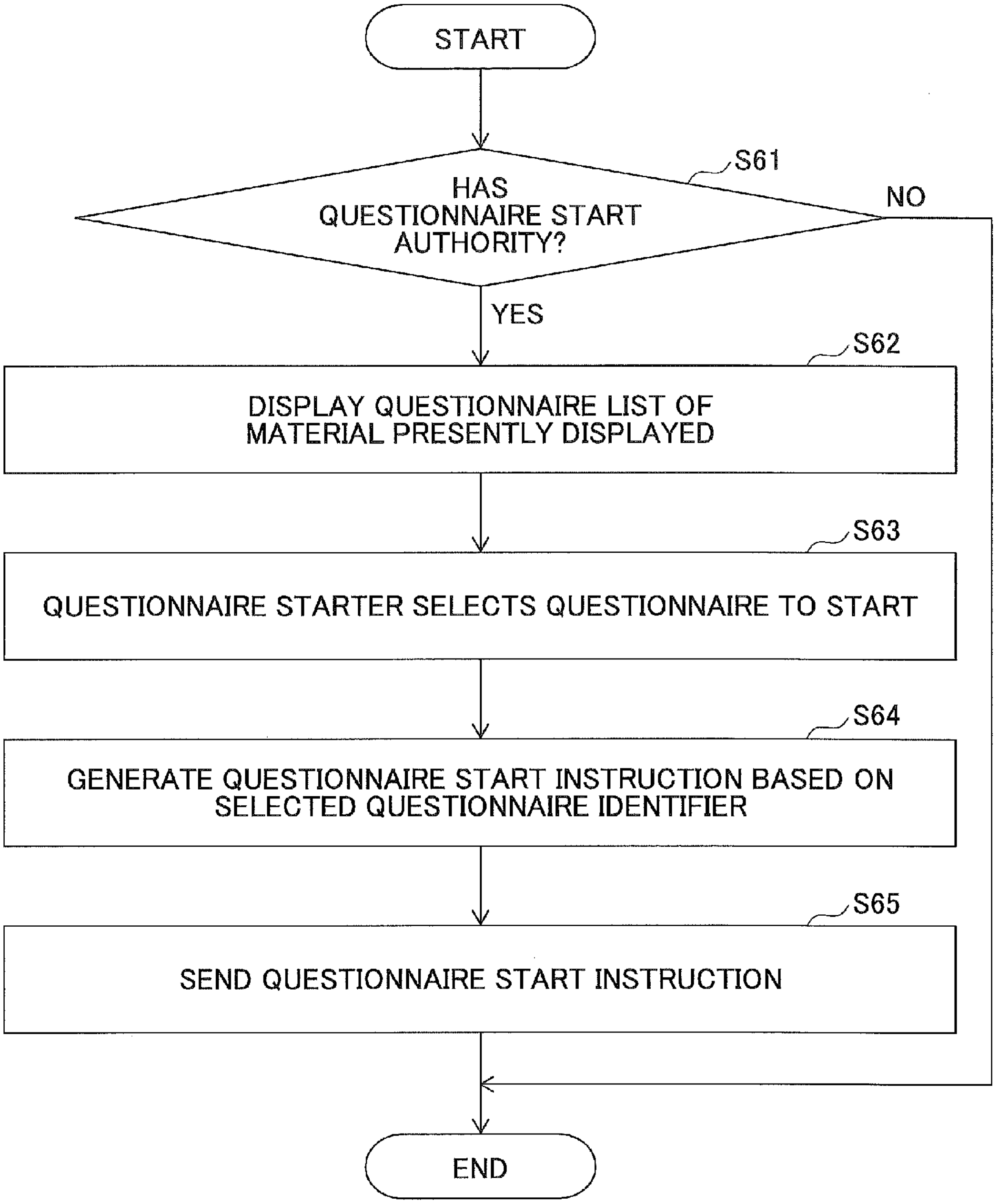
FIG. 13 is a flowchart of an example of a questionnaire start process.

FIG. 13 is a flowchart of an example of a questionnaire start process. The questionnaire start process of FIG. 13 is started, for example, as the questionnaire start button, etc., in the conference screen displayed on the conference client device 10, is pressed by the person performing operations.

In step S61, the questionnaire instruction sending receiving unit 52 refers to the role table illustrated in FIG. 12 and determines whether the person performing operations of the own-device has the questionnaire start authority. The questionnaire instruction sending receiving unit 52 determines that the person performing operations has the questionnaire start authority when the role of the own-device is a presenter or an operator.

Figure 14:
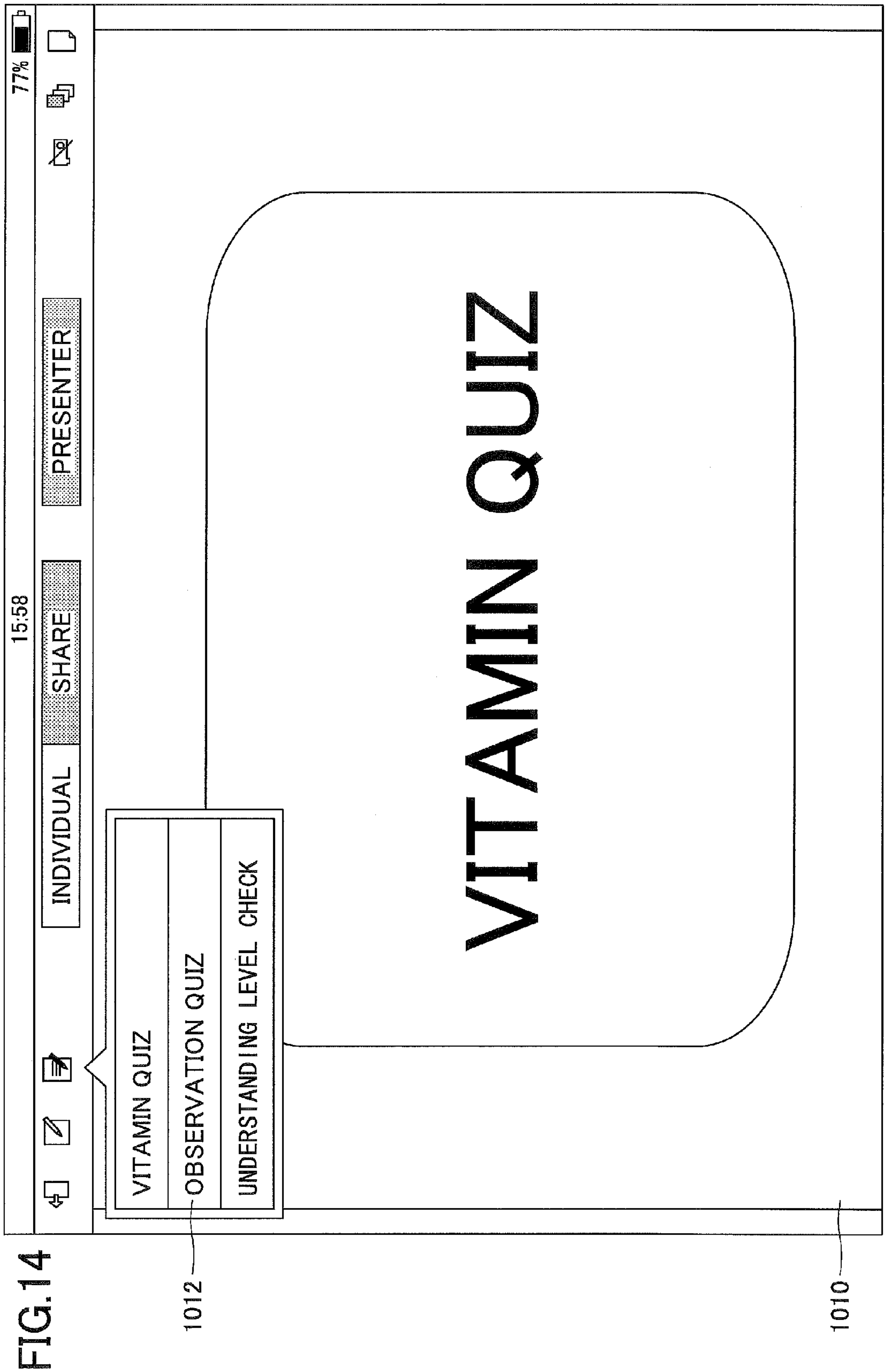
FIG. 14 is an image diagram of an example of a conference screen of the presenter in which the list of questionnaires is displayed.

When the person performing operations has the questionnaire start authority, the questionnaire instruction sending receiving unit 52 proceeds to step S62, refers to the questionnaire information of FIG. 7, and displays a list of questionnaires associated with the conference material displayed in the conference screen. FIG. 14 is an image diagram of an example of a conference screen of the presenter in which the list of questionnaires is displayed. Note that FIG. 14 illustrates an example in which a list of questionnaires 1012 including three questionnaire names is displayed in a conference screen 1010 of the presenter.

Figure 15:
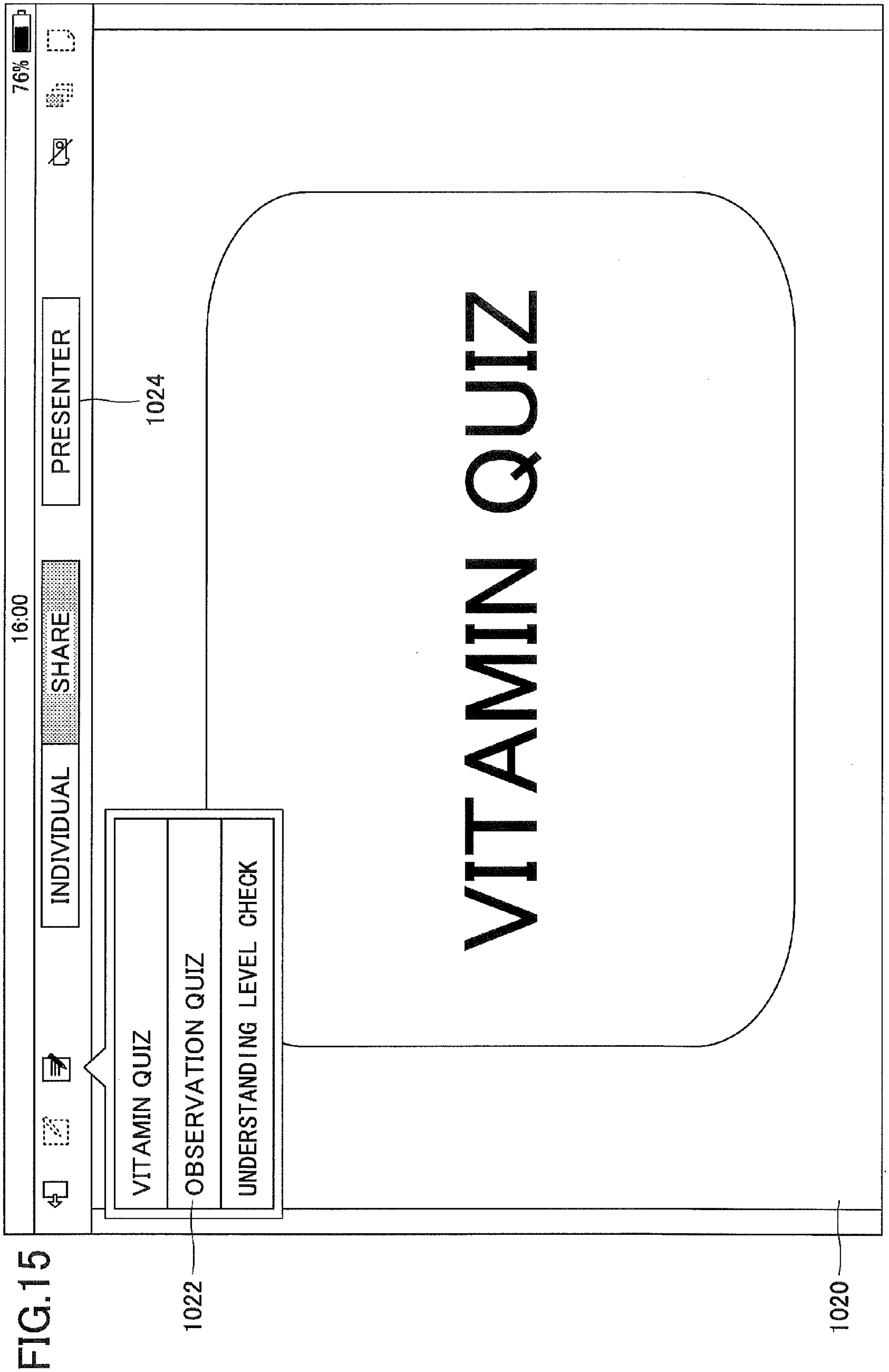
FIG. 15 is an image diagram of an example of a conference screen of the operator in which a list of questionnaires is displayed.

Note that when the person performing operations of the conference client device 10 is the operator, the questionnaire instruction sending receiving unit 52 displays a conference screen 1020 of an operator in which a list of questionnaires 1022 is displayed, as illustrated in FIG. 15. FIG. 15 is an image diagram of an example of a conference screen of the operator in which a list of questionnaires is displayed. The conference screen 1020 of FIG. 15 is different from the conference screen 1010 of FIG. 14 in that the presenter button 1024 is not in a selected state.

In step S61, when the person performing operations does not have the questionnaire start authority, the questionnaire instruction sending receiving unit 52 ends the process of the flowchart of FIG. 13 without sending a questionnaire start instruction. As described above, a person performing operations who does not have the questionnaire start authority is unable to start the questionnaire. Note that the conference client device 10 that does not have the questionnaire start authority may be in a state where a questionnaire start button 1032 cannot be pressed, as in a conference screen 1030 of FIG. 16.

In step S63, the person performing operations having the questionnaire start authority selects the questionnaire that he or she wants to start, from the list of questionnaires 1012 in FIG. 14, etc. In step S64, the questionnaire instruction sending receiving unit 52 generates a questionnaire start instruction as illustrated in FIG. 17, based on the questionnaire identifier of the questionnaire selected from the list of questionnaires 1012, etc.

FIG. 17 is a configuration diagram of an example of a questionnaire start instruction. The example of the questionnaire start instruction of FIG. 17 includes a questionnaire identifier "123". In step S65, the questionnaire instruction sending receiving unit 52 sends the generated questionnaire start instruction to the conference server device 12, and ends the process of the flowchart of FIG. 13.

The conference server device 12 that has received the questionnaire start instruction of FIG. 17 distributes the questionnaire start instruction to the conference client devices 10 that are participating in the conference. Then, the conference client device 10 that has received the questionnaire start instruction from the conference server device 12 executes a questionnaire display process as illustrated in FIG. 18.

Figure 18:
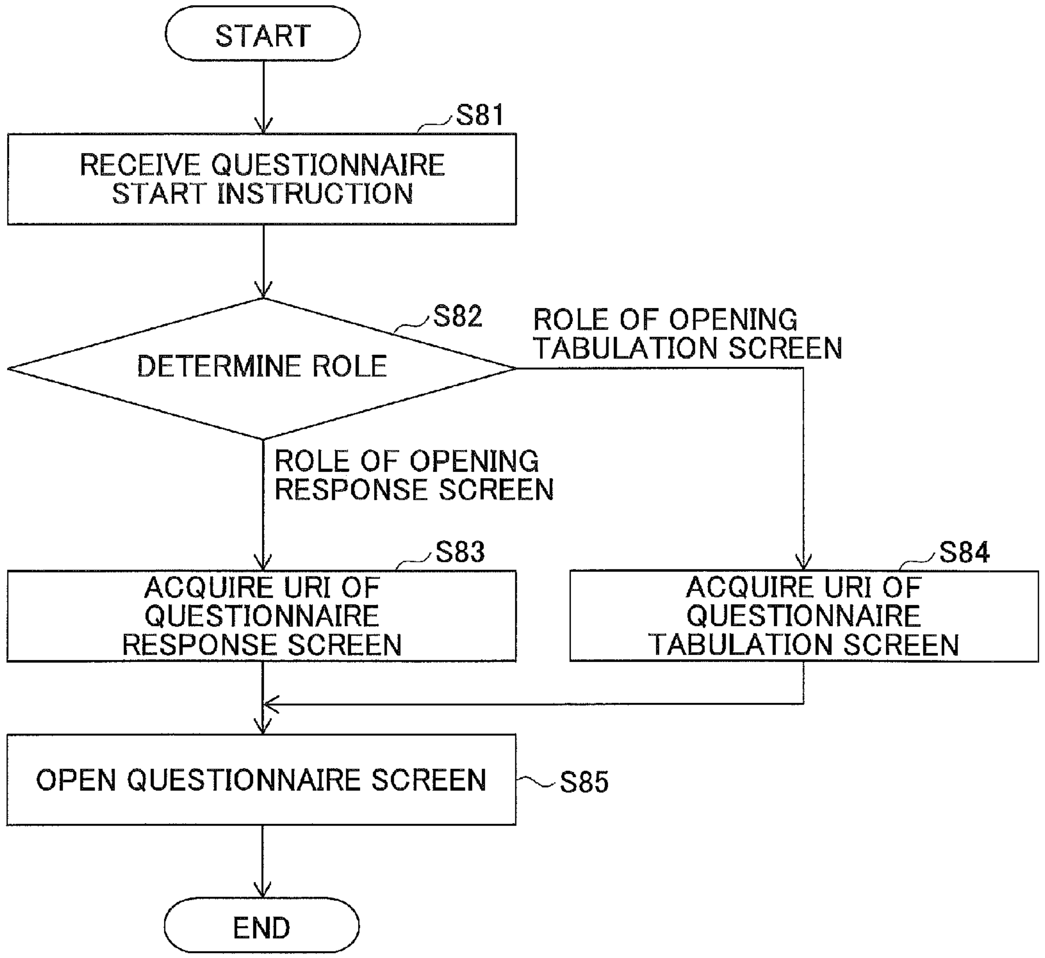
FIG. 18 is a flowchart of an example of a questionnaire display process.

FIG. 18 is a flowchart of an example of a questionnaire display process. In step S81, the conference client device 10 receives the questionnaire start instruction. In step S82, the role determining unit 54 of the conference client device 10 refers to the role table of FIG. 12 and determines the role of the own-device. Then, the questionnaire screen display unit 53 refers to the role information of FIG. 8, and determines whether the role of the person performing operations is a role to open the questionnaire tabulation screen or the role to open the questionnaire response screen.

When the role of the person performing operations is to open the questionnaire response screen, the questionnaire screen display unit 53 proceeds to step S83, refers to the questionnaire information of FIG. 7, and acquires a response screen URI that is the connection destination in the case of displaying the questionnaire response screen. Then, the questionnaire screen display unit 53 proceeds to step S85, connects to the response screen URI, and displays the questionnaire response screen.

Meanwhile, when role of the person performing operations is to open the questionnaire tabulation screen, the questionnaire screen display unit 53 proceeds to step S84, refers to the questionnaire information of FIG. 7, and acquires a tabulation screen URI that is the connection destination in the case of displaying the questionnaire tabulation screen. Then, the questionnaire screen display unit 53 proceeds to step S85, connects to the tabulation screen URI, and displays the questionnaire tabulation screen.

Figure 19:
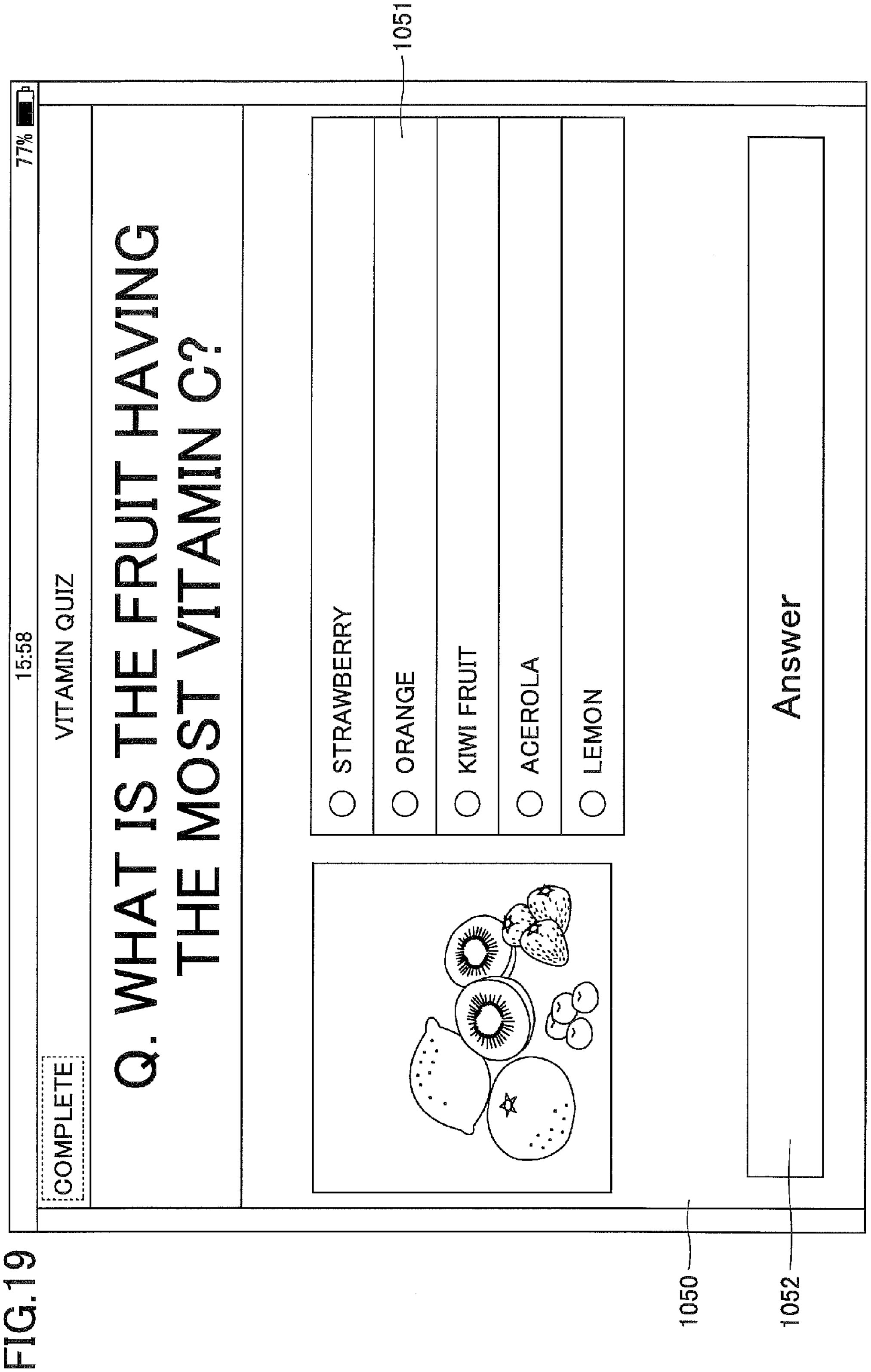
FIG. 19 is an image diagram of an example of a questionnaire response screen.
Figure 20:
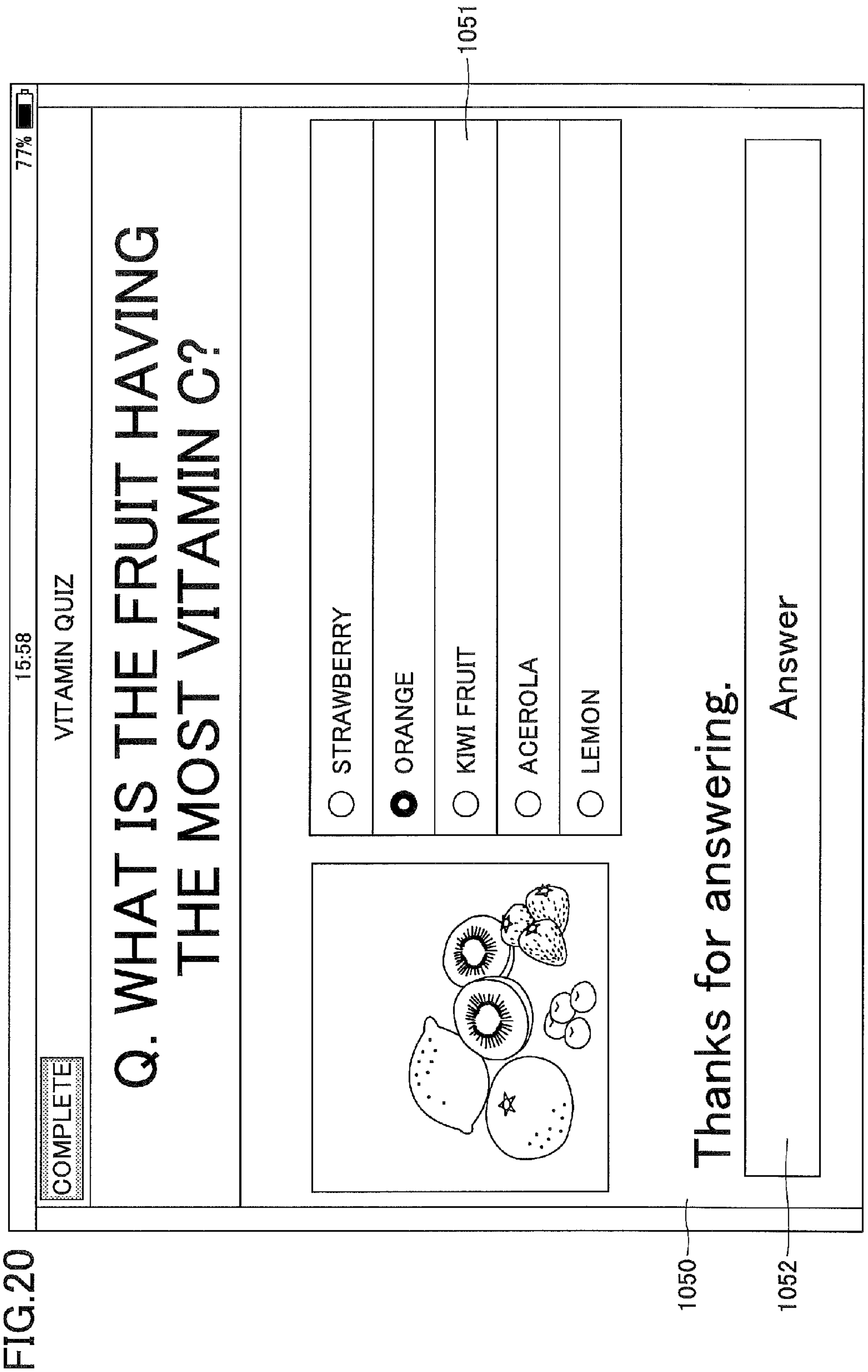
FIG. 20 is an image diagram of an example of a questionnaire response screen after sending the questionnaire result to the conference server device.

FIG. 19 is an image diagram of an example of a questionnaire response screen. A questionnaire response screen 1050 of FIG. 19 includes a response field 1051 and a response button 1052. The person performing operations having the role of a participant is able to send a questionnaire result to the conference server device 12 by inputting the questionnaire result in the response field 1051, and pressing the response button 1052. Furthermore, FIG. 20 is an image diagram of an example of a questionnaire response screen after sending the questionnaire result to the conference server device 12.

Figure 21:
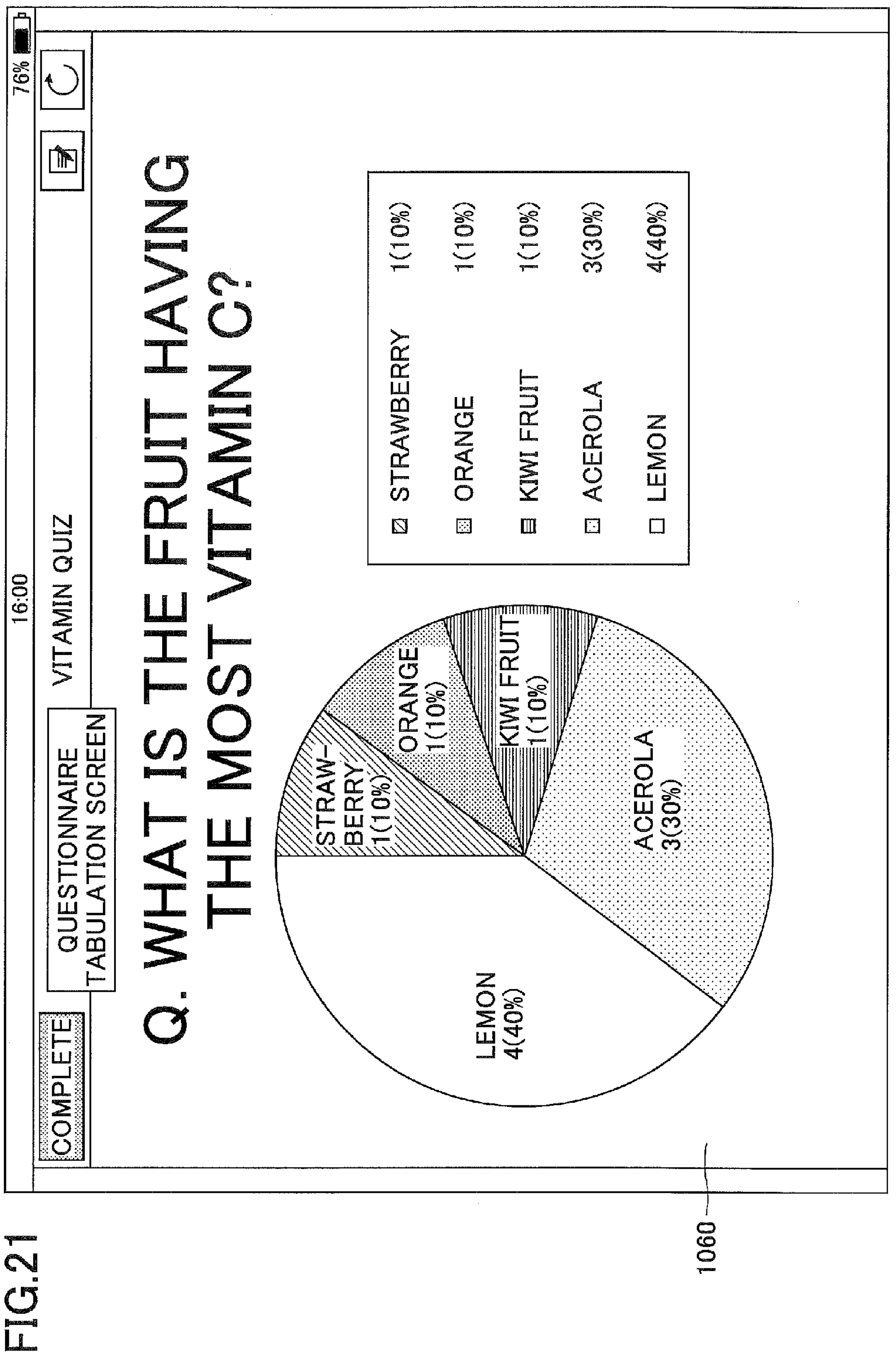
FIG. 21 is an image diagram of an example of a questionnaire tabulation screen.

FIG. 21 is an image diagram of an example of a questionnaire tabulation screen. In the questionnaire tabulation screen 1060 of FIG. 21, the questionnaire results sent from the conference client devices 10 having the role of a participant are tabulated. For example, the questionnaire tabulation screen of FIG. 21 may be realized by using a script operating on a browser for dynamically displaying a graph of the questionnaire tabulation result.

Figure 22:
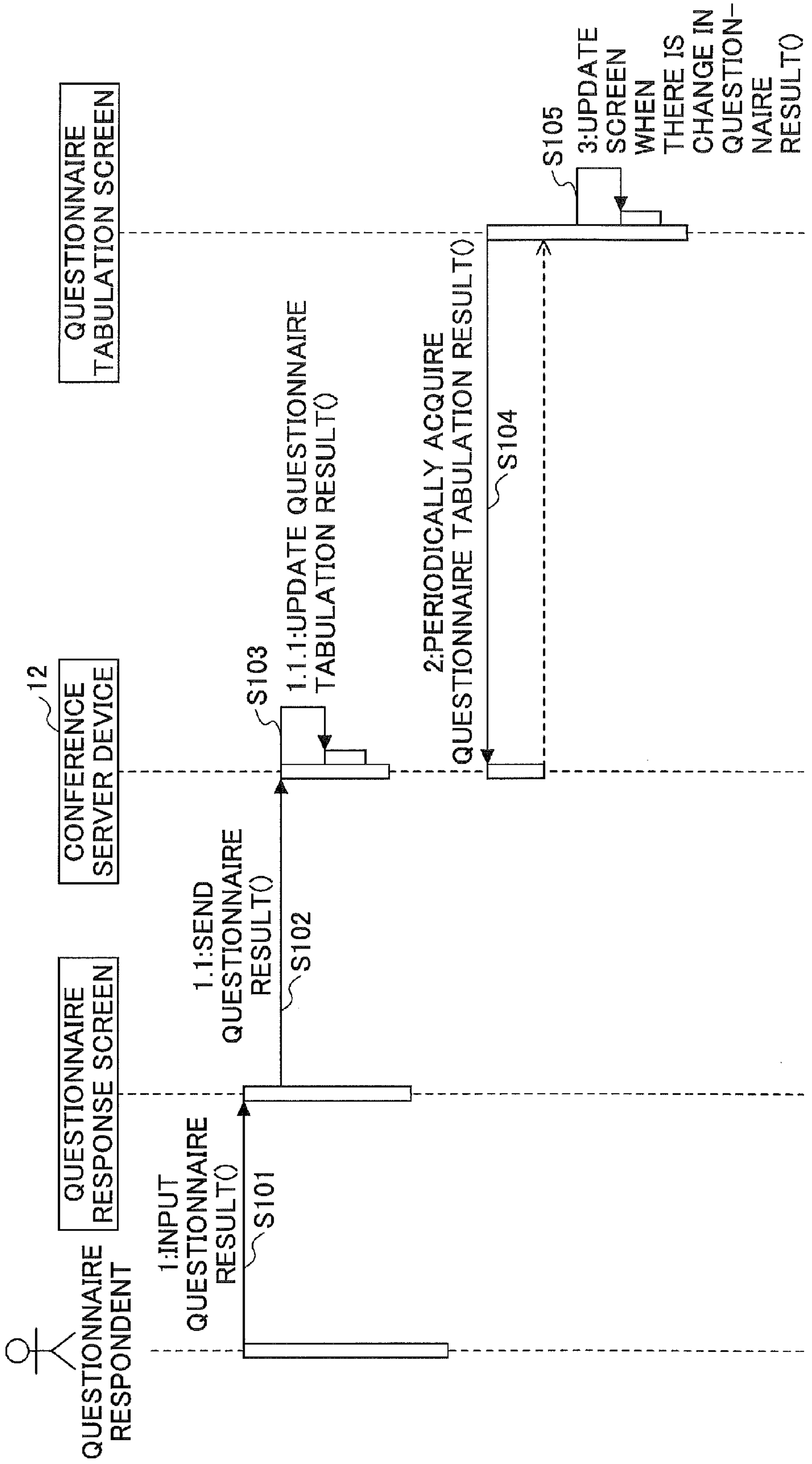
FIG. 22 is a sequence diagram of an example of a questionnaire result tabulation process.

FIG. 22 is a sequence diagram of an example of a questionnaire result tabulation process. In step S101, the questionnaire respondent having the role of a participant inputs a questionnaire result in the response field 1051 of the questionnaire response screen 1050, and presses the response button 1052.

In step S102, the questionnaire screen display unit 53 of the conference client device 10 operated by a participant sends the questionnaire result to the conference server device 12. In step S103, the information management unit 64 of the conference server device 12 updates the questionnaire tabulation result according to the received questionnaire result.

In step S104, the questionnaire screen display unit 53 of the conference client device 10 operated by the presenter or the operator periodically connects to the tabulation screen URI, and acquires the questionnaire tabulation result. When there is a change in the questionnaire tabulation result, the questionnaire screen display unit 53 performs a process of updating the displayed questionnaire tabulation screen 1060.

According to the process illustrated in the sequence diagram of FIG. 22, the questionnaire tabulation result of the questionnaire tabulation screen 1060 displayed on the conference client device 10 can be updated in a real-time manner or periodically.

Note that the questionnaire tabulation screen 1060 may be displayed on the conference display device 14, other than the conference client device 10 having the role of the presenter or the operator. In the description of the present embodiment, the conference system 1 is taken as an example; however, the present embodiment is also applicable to a system in which the displayed content is changed according to the role of the person performing operations of the client device.

For example, the present embodiment is applicable to various systems, such as a bidding system in which there are roles of a seller and a buyer, a learning system in which there are roles of a teacher and a student, and a quiz system in which there are roles of a quizzer and a respondent. Furthermore, the present embodiment may be applicable to cases where the shown material is to be changed, for example, in a presentation system in which there are roles of an outsider and an insider.

<Overview>

In the conference system 1 according to the present embodiment, the questionnaire is not associated with the paging operation of the conference material or a page number of the conference material, and thus does not cause a problem of not being able to change the order of the questionnaire or a problem where the questionnaire cannot be started without the paging operation.

Furthermore, the conference system 1 according to the present embodiment does not cause a problem where the questionnaire is unintendedly started when the page is switched (move to arbitrary page) or the page is returned to a previous page. Furthermore, the conference system 1 according to the present embodiment is able to omit the questionnaire according to the progress of the conference. As described above, in the conference system 1 according to the present embodiment, it is possible to start and stop one or more questionnaires associated to the same conference material, at an arbitrary timing and in an arbitrary order.

Furthermore, the conference system 1 according to the present embodiment can determine the role of the conference client device 10 after receiving a questionnaire start instruction, and change the questionnaire screen to be displayed according to the role. Therefore, the conference system 1 according to the present embodiment can display a questionnaire screen according to the role, even when the role dynamically changes after the conference starts.

For example, in the conference system 1 according to the present embodiment, the role of the conference client device 10 whose terminal name has changed to the same name as the operator identifier after the conference has started, changes to the operator. Furthermore, in the conference system 1 according to the present embodiment, the role of the conference client device 10 changes from a participant to a presenter, or from a presenter to a participant, by using a XMPP message for changing the role.

In the conference system 1 according to the present embodiment, a role of an operator is provided as a role that cannot be switched by a XMPP message, apart for the roles of the presenter and the participant that can be switched by the XMPP message for changing the role. Furthermore, in the conference system 1 according to the present embodiment, the operator is able to perform at least part of the operations that can be performed by the presenter.

Therefore, in the conference system 1 according to the present embodiment, when the presenter is inexperienced, or when an unexpected situation occurs, the operator is able to follow-up the presenter by performing the operations from the conference client device 10 in place of the presenter.

In the conference system 1 according to the present embodiment, the conference client device 10 acquires the role information before participating in the conference client device 10, and is thus able to determine the type of the questionnaire screen (the questionnaire tabulation screen or the questionnaire response screen) according to the role. Furthermore, in the conference system 1 according to the present embodiment, the conference client device 10 acquires the questionnaire information before participating in the conference, and is thus able to determine the connection destination according to the type of questionnaire screen for each questionnaire associated with the conference material.

Therefore, in the conference system 1 according to the present embodiment, even when role of the conference client device 10 dynamically changes after the conference starts, it is possible to display the questionnaire tabulation screen or the questionnaire response screen according to the role.

Second Embodiment

In the first embodiment, a person performing operations of the conference client device 10 participating in the conference is able to acquire the role of the presenter (presenting right). For example, in the conference system 1 for performing a conference in the form of round-table talk, the people performing operations of a plurality of conference client devices 10 determined in advance sequentially acquire the presenting right and makes a presentation. However, in the conference system 1 for performing a conference in the form of round-table talk, there are cases where the presenting right is not to be given to a person other than predetermined people performing operations of conference client devices 10.

Therefore, in the conference system 1 according to a second embodiment, the people performing operations of the conference client devices 10 that are able to acquire the role of the presenter (presenting right), are restricted to particular people particular people performing operations of the conference client devices 10 as described below. Note that in the following, the same descriptions as those of the first embodiment are omitted.

In the second embodiment, the conference information of FIG. 5 includes attribute information indicating whether the conference has limited presenters, instead of the operator identifier. By the attribute information indicating whether the conference is has limited presenters, the conference client device 10 can determine whether the conference in which it is participating is a conference having limited presenters.

Note that in the second embodiment, instead of the role determining process according to the operator identifier included in the conference information of FIG. 5, a role determining process according to the role determining information illustrated in FIG. 23 is performed. FIG. 23 is a configuration diagram of an example of role determining information.

The role determining information of FIG. 23 associates the role name such as the operator or the presenter, with the terminal name. For example, FIG. 23 indicates that the role of the conference client device 10 having a terminal name “operator” is the “operator”, and the role of the conference client device 10 having a terminal name “ichiro” is the initial “presenter”. Note that the terminal name “operator” may be set for a plurality of conference client devices 10.

Figure 24:
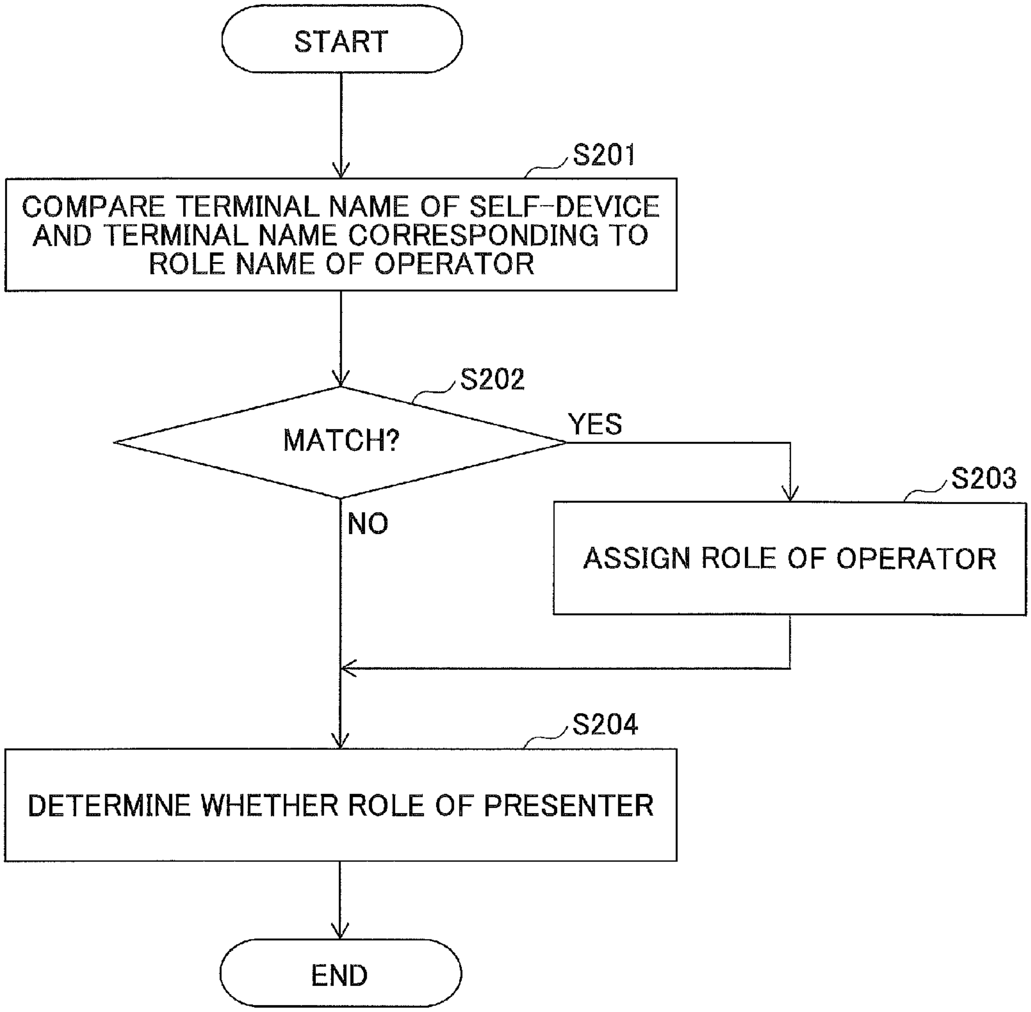
FIG. 24 is a flowchart of another example of the role determining process.

The role determining unit 54 of each conference client device 10 performs the role determining process illustrated in FIG. 24, and determines the role of the own-device. Note that the role determining process is performed when participating in the conference, when the terminal name of the own-device has changed, or when an instruction to change the role is received during the conference.

FIG. 24 is a flowchart of another example of the role determining process. In step S201, the role determining unit 54 of the conference client device 10 compares the terminal name corresponding to the role name of the operator included in the role determining information of FIG. 23, with the terminal name of the own-device.

In step S202, the role determining unit 54 determines whether the terminal name corresponding to the role name of the operator included in the role determining information of FIG. 23 and the terminal name of the own-device match each other. When the terminal name corresponding to the role name of the operator included in the role determining information of FIG. 23 and the terminal name of the own-device match each other, the role determining unit 54 proceeds to step S203, assigns the role of the operator to the own-device, and proceeds to step S204.

Note that in step S202, when the terminal name corresponding to the role name of the operator included in the role determining information of FIG. 23 and the terminal name of the own-device do not match each other, the role determining unit 54 proceeds to step S204. In step S204, the role determining unit 54 determines whether the role is a presenter, and assigns the role of the presenter of the participant to the own-device.

By the role determining process of FIG. 24, in the conference system 1 according to the second embodiment, as long as the conference client device 10 whose terminal name of own-device is the terminal name “operator” corresponding to the role name of the operator, the role of the operator can be assigned to any number of conference client devices 10. Note that the role determining unit 54 manages the determined role of the own-device by, for example, the role table illustrated in FIG. 12.

In the second embodiment, by the role table of FIG. 12, each conference client device 10 manages the role of the own-device as described below, according to information indicating whether the own-device is an operator and information indicating whether the own-device is a presenter or a participant.

The roles of the own-device managed by the role table of FIG. 12 include "operator and presenter", "operator and participant", "not operator but presenter", and "not operator but participant".

The conference client device 10 whose role of own-device is "operator and presenter" and "operator and participant", is able to acquire the role (presenting right) of the presenter, and is able to acquire or release the presenting right during the conference.

Meanwhile, the conference client device 10 whose role of own-device is "not operator but presenter" is unable to release the role of the presenter (presenting right) during the conference. The conference client device 10 whose role of own-device is "not operator but participant" is unable to acquire the role of the presenter (presenting right) during the conference.

The conference screen display unit 51 determines whether the conference that it is participating in is a conference having limited presenters, according to attribute information indicating whether the conference has limited presenters. When the conference that it is participating in is not a conference having limited presenters, the conference screen display unit 51 determines the role of the person performing operations of the conference client device 10 from the role table of FIG. 12, and displays a conference screen 1010, 1020, and 1030 according to the role indicated in the first embodiment.

Meanwhile, when the conference that it is participating in is a conference having limited presenters, the conference screen display unit 51 displays the conference screen having the UI part illustrated in FIGS. 25A through 25D, according to the role of the own-device described above, managed by the role table of FIG. 12. FIGS. 25A through 25D are image diagrams of examples of conference screens having UI parts according to the roles.

Figure 25A:
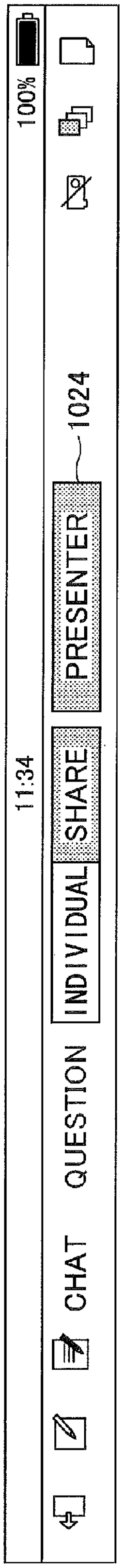
FIGS. 25A through 25D are image diagrams of examples of conference screens having UI parts according to the roles.
Figure 25B:
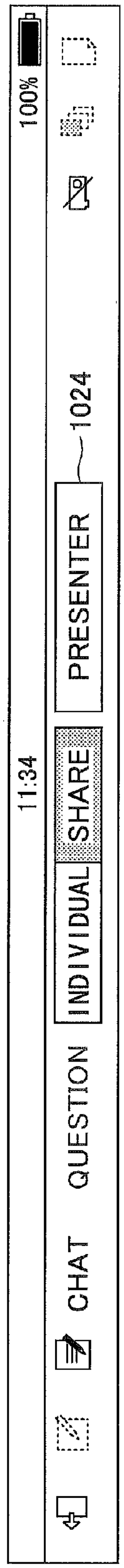

FIG. 25A illustrates an example of a UI part of a conference screen when the role is "operator and presenter". Furthermore, FIG. 25B illustrates an example of a UI part of a conference screen when the role is "operator and participant". In the conference screen having a UI part as illustrated in FIG. 25A or FIG. 25B, it is possible to switch the presenter by pressing a presenter button 1024.

Figure 25C:
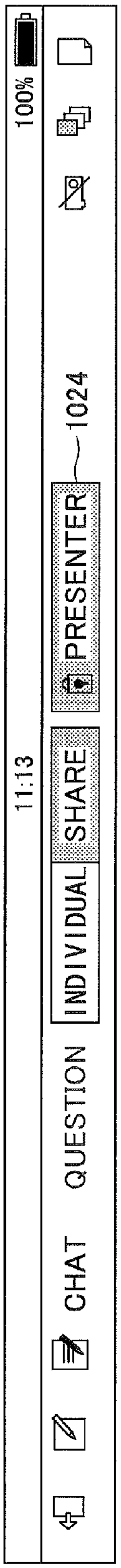
Figure 25D:
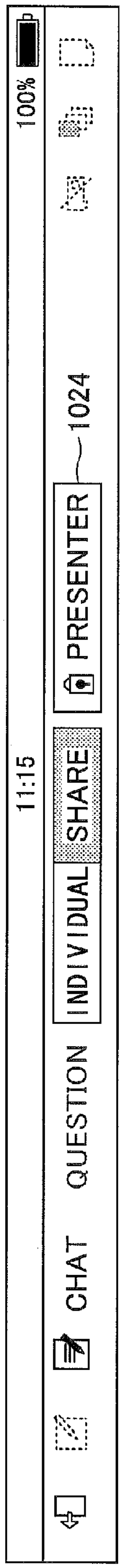

FIG. 25C illustrates an example of a UI part of a conference screen when the role is "not operator but presenter". Furthermore, FIG. 25D illustrates an example of a UI part of a conference screen when the role is "not operator but participant". In the conference screen having a UI part as illustrated in FIG. 25C or FIG. 25D, it is not possible to press the presenter button 1024, and therefore the presenter cannot be switched.

<Overview>

In the conference system 1 according to the second embodiment, only the conference client device 10 having the role of the operator is able to perform the operation of switching the presenter, and therefore a person other than predetermined people performing operations of conference client devices 10 is unable to acquire the presenting right. Therefore, in the conference system 1 according to the second embodiment, there are no instances where the participant erroneously acquires the presenting right and cause a confusion in the conference.

The terminal device and the information processing system are not limited to the specific embodiments described herein, and variations and modifications may be made without departing from the spirit and scope of the present invention. For example, the conference server device 12 is an example of an information processing apparatus. The conference client device 10 is an example of a terminal device. The conference screen display unit 51 is an example of a target content display unit. The role determining unit 54 is an example of a role determining unit. The questionnaire instruction sending receiving unit 52 is an example of a processing unit. The conference control unit 61 is an example of a control unit. The conference material is an example of a target content. The operator is an example of a substitute operator. The conference system 1 is an example of an information processing system.

Note that the conference system 1 including the conference client device 10, the conference server device 12, and the conference display device 14 is one example, and there may be various configuration examples according to the usage and purpose.

According to one embodiment of the present invention, a terminal device and an information processing system are provided, in which a second role, which is different form a first role that can perform operations on a shared screen, is able to execute at least a part of the operations that the first role can execute.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.)

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Patent Application No. 2014-128323, filed on Jun. 23, 2014, and Japanese Priority Patent Application No. 2015-080169, filed on Apr. 9, 2015, the entire contents of which are hereby incorporated herein by reference.

What is claimed is:

1. A terminal device for sharing a display of a target content with another terminal device, the terminal device comprising: a processor; and a memory storing an application program that, when executed by the processor, causes the processor to send a conference participation request to a conference server device; receive conference information from the conference server device, in response to the conference participation request, the conference information including identification information of the second role, first role information indicating a plurality of different operations executable during the conference at the terminal device to which the first role is assigned, and second role information indicating a first operation from among the plurality of different operations that is executable in the terminal device to which the second role is assigned, a second operation from among the plurality of different operations that is not executable in the terminal device to which the second role is assigned, the second operation being an operation different from the first operation; determine a role of an own-device that is the terminal device itself, from between a first role or a second role, the first role being able to apply an operation performed with respect to the target content included in the own-device to the target content included in the other terminal device, and the second role being able to perform at least a part of the operation that the first role is able to perform and apply to the other terminal device, and determine whether the identification information of the second role included in the received conference information matches the terminal identification information of the own-device, wherein if the identification information of the second role included in the received conference information matches the terminal identification information of the own-device, determines that the own-device is assigned the second role; receive, from a person performing operations, at least a part of the operation that the first role is able to perform, and apply the received operation to the target content included in the other terminal device, in a case where the determined role of the own-device is the second role; and display the target content included in the own-device upon applying, to the target content included in the own-device, the operation performed at the terminal device having the first role, based on information sent from the terminal device having the first role, when the determined role of the own-device is not the first role, wherein whether the role of the own-device is the second role is determined based on device identification information for identifying a machine of the own-device and identification information of the second role included in conference information, the second role is dynamically changed according to a change in the device identification information even after sharing of the display of the target content has started, in a case where the device identification information of the own-device is variable, and in a case where the first role is assigned to the own-device, the plurality of different operations are executed at the own-device based on the first role information, and in a case where the second role is assigned to the own-device, the execution of the first operation on behalf of the terminal device to which the first role is assigned, based on the second role information, the display screen synchronized among the terminal devices participating in the conference is changed.

2. The terminal device according to claim 1, wherein execution of the application program further causes the processor to determine the role of the own-device, from between the first role or a third role that displays the target content upon applying, to the target content, the operation executed on the target content at the terminal device having the first role, and in a case where the determined role of the own-device is the third role but not the second role, the own-device is unable to apply the operation, which is executed on the target content at the own-device, to the target content included in the other terminal device.

3. The terminal device according to claim 2, wherein the first role and the third role are dynamically changed from when sharing of the display of the target content starts to when the sharing ends, based on an instruction to change the terminal device having the first role, the instruction being sent and received among a plurality of the terminal devices.

4. The terminal device according to claim 2, wherein in a case of a setting where the terminal device that is able to have the first role is restricted, the terminal device having the second role is able to dynamically change the role to the first role from when sharing of the display of the target content starts to when the sharing ends, based on an instruction to change the terminal device having the first role, the instruction being sent and received among a plurality of the terminal devices.

5. The terminal device according to claim 1, wherein execution of the application further causes the processor to determine the role of the own-device when sharing of the display starts and when the device identification information changes, in a case where the device identification information of the own-device is variable, and determine the role of the own-device when sharing of the display starts, in a case where the device identification information of the own-device is invariable.

6. The terminal device according to claim 1, wherein execution of the application farther causes the processor to receive the identification information of the second role from an information processing apparatus for controlling communication of operation information with respect to the target content transmitted and received between the own-device and the other terminal device.

7. The terminal device according to claim 1, wherein the first role is a presenter, the second role is a substitute operator who performs the operations of the presenter in place of the presenter, and the third role is a participant.

8. The terminal device according to claim 1, wherein the conference information is stored at an information processing apparatus separate from the plurality of terminal devices, and the conference information includes at least one of a conference identifier, a conference name, a convene time, and a convene password in addition to the operator identifier.

9. The terminal device according to claim 1, wherein the terminal identification information of the own-device is a terminal name.

10. The terminal device according to claim 1, wherein the determined role of the own-device is initially determined based on operator identified information included in the target content.

11. A non-transitory computer-readable recording medium storing a program that causes a computer to execute a process, the process comprising: sending a conference participation request to a conference server device; receiving conference information from the conference server device, in response to the conference participation request, the conference information including identification information of the second role, first role information indicating a plurality of different operations executable during the conference at the terminal device to which the first role is assigned, and second role information indicating a first operation from among the plurality of different operations that is executable in the terminal device to which the second role is assigned, a second operation from among the plurality of different operations that is not executable in the terminal device to which the second role is assigned, the second operation being an operation different from the first operation; determining a role of an own-device that is a terminal device itself, from between a first role or a second role, the first role being able to apply an operation performed with respect to a target content included in the own-device to the target content included in another terminal device, and the second role being able to perform at least a part of the operation that the first role is able to perform and apply to the other terminal device, and determine whether the identification information of the second role included in the received conference information matches the terminal identification information of the own-device, wherein if the identification information of the second role included in the received conference information matches the terminal identification information of the own-device, determines that the own-device is assigned the second role; receiving, from a person performing operations, at least a part of the operation that the first role is able to perform, and applying the received operation to the target content included in the other terminal device, in a case where the determined role of the own-device is the second role; and displaying the target content included in the own-device upon applying, to the target content included in the own-device, the operation performed at the terminal device having the first role, based on information sent from the terminal device having the first role, when the determined role of the own-device is not the first role, when the determining includes determining whether the role of the own-device is the second role, based on device information for identifying a machine of the own-device and identification information of the second role included in conference information, the second role is dynamically changed according to a change in the device identification information even after sharing of the display of the target content has started, in a case where the device identification information of the own-device is variable, and in a case where the first role is assigned to the own-device, the plurality of different operations are executed at the own-device based on the first role information, and in a case where the second role is assigned to the own-device, the execution of the first operation on behalf of the terminal device to which the first role is assigned, based on the second role information, the display screen synchronized among the terminal devices participating in the conference is changed.

12. The non-transitory computer-readable recording medium according to claim 11, wherein the determining includes determining the role of the own-device, from between the first role or a third role that displays the target content upon applying, to the target content, the operation executed on the target content at the terminal device having the first role, and in a case where the determined role of the own-device is the third role but not the second role, the own-device is unable to apply the operation, which is executed on the target content at the own-device, to the target content included in the other terminal device.

13. The non-transitory computer-readable recording medium according to claim 12, wherein the first role and the third role are dynamically changed from when sharing of the display of the target content starts to when the sharing ends, based on an instruction to change the terminal device having the first role, the instruction being sent and received among a plurality of the terminal devices.

14. The non-transitory computer-readable recording medium according to claim 12, wherein in a case of a setting where the terminal device that is able to have the first role is restricted, the terminal device having the second role is able to dynamically change the role to the first role from when sharing of the display of the target content starts to when the sharing ends, based on an instruction to change the terminal device having the first role, the instruction being sent and received among a plurality of the terminal devices.

15. The non-transitory computer-readable recording medium according to claim 11, wherein the determining includes determining the role of the own-device when sharing of the display starts and when the device identification information changes, in a case where the device identification information of the own-device is variable, and the determining includes determining the role of the own-device when sharing of the display starts, in a case where the device identification information of the own-device is invariable.

16. The non-transitory computer-readable recording medium according to claim 11, wherein the determining includes receiving the identification information of the second role from an information processing apparatus for controlling communication of operation information with respect to the target content transmitted and received between the own-device and the other terminal device.

17. The non-transitory computer-readable recording medium according to claim 11, wherein the first role is a presenter, the second role is a substitute operator who performs the operations of the presenter in place of the presenter, and the third role is a participant.

18. The non-transitory computer-readable recording medium according to claim 11, wherein the conference information is stored at an information processing apparatus separate from the plurality of terminal devices, and the conference information includes at least one of a conference identifier, a conference name, a convene time, and a convene password in addition to the operator identifier.

19. The non-transitory computer-readable recording medium according to claim 11, wherein the terminal identification information of the own-device is a terminal name.

20. The non-transitory computer-readable recording medium according to claim 11, wherein the determined role of the own-device is initially determined based on operator identified information included in the target content.

21. An information processing system for sharing a display of a target content among a plurality of terminal devices, the information processing system comprising: an information processing apparatus that includes a first processor; and a first memory that stores the target content that is a target of display sharing, and an application program that, when executed by the first processor, causes the one or more processors to implement functions of a control unit to send the target content that is the target of display sharing to the plurality of terminal devices, and control distribution of an instruction for sharing the display of the target content among the plurality of terminal devices, the instruction being distributed to the plurality of terminal devices, wherein each of the plurality of terminal devices includes a second processor; and a second memory storing an application program that, when executed by the processor, causes the processor to send a conference participation request to a conference server device; receive conference information from the conference server device, in response to the conference participation request, the conference information including identification information of the second role, first role information indicating a plurality of different operations executable during the conference at the terminal device to which the first role is assigned, and second role information indicating a first operation from among the plurality of different operations that is executable in the terminal device to which the second role is assigned, a second operation from among the plurality of different operations that is not executable in the terminal device to which the second role is assigned, the second operation being an operation different from the first operation; determine a role of an own-device that is a terminal device itself, from between a first role or a second role, the first role being able to apply an operation performed with respect to a target content included in the own-device to the target content included in another terminal device, and the second role being able to perform at least a part of the operation that the first role is able to perform and apply to the other terminal device, and determine whether the identification information of the second role included in the received conference information matches the terminal identification information of the own-device, wherein if the identification information of the second role included in the received conference information matches the terminal identification information of the own-device, determines that the own-device is assigned the second role; receive, from a person performing operations, at least a part of the operation that the first role is able to perform, and apply the received operation to the target content included in the other terminal device, in a case where the determined role of the own-device is the second role; and display the target content included in the own-device upon applying, to the target content included in the own-device, the operation performed at the terminal device having the first role, based on information sent from the terminal device having the first role, when the determined role of the own-device is not the first role, wherein determines whether the role of the own-device is the second role, based on device identification information for identifying a machine of the own-device and identification information of the second role included in conference information, the second role is dynamically changed according to a change in the device identification information even after sharing of the display of the target content has started, in a case where the device identification information of the own-device is variable, and in a case where the first role is assigned to the own-device, the plurality of different operations are executed at the own-device based on the first role information, and in a case where the second role is assigned to the own-device, the execution of the first operation on behalf of the terminal device to which the first role is assigned, based on the second role information, the display screen synchronized among the terminal devices participating in the conference is changed.

22. The information processing system according to claim 21, wherein the conference information is stored at the information processing apparatus and the conference information includes at least one of a conference identifier, a conference name, a convene time, and a convene password in addition to the operator identifier.

23. The information processing system according to claim 21, wherein the the terminal identification information of the own-device is a terminal name.

24. The information processing system according to claim 21, wherein the determined role of the own-device is initially determined based on operator identified information included in the target content.

* * * * *